(12) United States Patent
Wan et al.

(10) Patent No.: US 6,580,754 B1
(45) Date of Patent: Jun. 17, 2003

(54) VIDEO COMPRESSION FOR MULTICAST ENVIRONMENTS USING SPATIAL SCALABILITY AND SIMULCAST CODING

(75) Inventors: Wade K. Wan, Cambridge, MA (US); Xuemin Chen, San Diego, CA (US); Ajay Luthra, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/546,647

(22) Filed: Apr. 10, 2000

Related U.S. Application Data

(60) Provisional application No. 60/171,774, filed on Dec. 22, 1999.

(51) Int. Cl.[7] .............................................. H04N 7/12
(52) U.S. Cl. .............................................. 375/240.01
(58) Field of Search ..................... 375/240.01, 240.08, 375/240.1, 240.11–240.16, 240.24, 240.27; 725/95, 96; 348/42; H04N 7/12

(56) References Cited

U.S. PATENT DOCUMENTS

| | | | | |
|---|---|---|---|---|
| 6,111,596 | A | * 8/2000 | Haskell et al. | ................. 348/42 |
| 6,151,362 | A | * 11/2000 | Wang | ..................... 375/240.12 |
| 6,233,017 | B1 | * 5/2001 | Chaddha | ................. 375/240.12 |
| 6,266,817 | B1 | * 7/2001 | Chaddha | ................. 375/240.11 |
| 6,292,512 | B1 | * 9/2001 | Radha et al. | ............ 375/240.1 |
| 6,137,462 | A1 | * 11/2001 | Boyce | ................... 375/240.27 |
| 6,392,705 | B1 | * 5/2002 | Chaddha | ................. 375/240.24 |

OTHER PUBLICATIONS

Radha, H. et al., "Scalable Internet Video using MPEG–4," Signal Processing Image Communications, vol. 15, No. 1–3, Sep. 1999, pp. 95–126.

Illgner, K. et al., "Spatially Scalable Video Compression Employing Resolution Pyramids," IEEE Journal on Selected Areas in Communications, vol. 15, No. 9, Dec. 1997, pp. 1688–1703.

Chiang, T. et al., "Hierarchial HDTV/SDTV Compatible Coding Using Kalman Statistical Filtering,", IEEE Transactions on Circuits and Systems for Video Technology, vol. 9, No. 3, Apr. 1999, pp. 424–437.

ITU–T Rec. Draft H.263 , "Video Coding For Low Bit Rate Communication", Sep. 26, 1997.

ISO/IEC 14496–2, MPEG–4 Video, Introduction ("Spatial scalability") and Section 7.9.2 "Spatial scalability", Oct. 1998.

ISO/IEC 13818–2, MPEG–2 Video, Section I.4.2 "Scalable extensions", Mar. 25, 1994.

* cited by examiner

Primary Examiner—Richard Lee
(74) Attorney, Agent, or Firm—Barry R. Lipsitz; Douglas M. McAllister

(57) ABSTRACT

An optimal system for determining whether simulcast coding (400) or spatial scalability coding (100) should be used to encode video for clients with a specific communication link. Operating points (A', B', C') for both simulcast coding and spatial scalability are also determined. Adaptive switching (3130, 3140) is provided, with the operating points and decision boundaries being used to guide the switching to optimize the quality of the higher-resolution data based on a bit allocation to the associated lower-resolution data. A system for determining the point (A', C') of equal quality in both layers of simulcast and spatial scalability coding is also provided. The proportion of bits allocated to the base layer to achieve equal quality is essentially independent of the total bit rate for both simulcast and spatial scalability.

40 Claims, 31 Drawing Sheets

VIDEO COMPRESSION FOR MULTICAST ENVIRONMENTS USING SPATIAL SCALABILITY AND SIMULCAST CODING

This application claims the benefit of U.S. Provisional Application No. 60/171,774, filed Dec. 22, 1999.

BACKGROUND OF THE INVENTION

The present invention relates to digital television and the like, and more particularly to a video coding scheme for multicast applications. The invention is particularly suitable for providing a streaming video server for multicast video over computer networks, such as Internet protocol (IP) networks. A multicast transmission can use simulcast ("Sim.") or spatial scalability ("SS") coding.

Usually, three major factors in a multicast video service need to be considered:

(1) The costs of reaching the audience (from the video-coding point of view);

(2) Quality of Service (e.g. visual quality); and (3) Encoding complexity vs. decoding complexity.

Some multicast systems have chosen to use simulcast coding (the independent coding of bitstreams to achieve video scalability) exclusively. The simulcast approach does not require additional encoder or decoder complexity and thus satisfies the third factor listed above.

For some application environments, codec complexity may not be an issue and the first two factors are the main concerns. For these services, the selection of the video compression (coding) scheme to be used often follows the rule that for a given total combined allocation of two or more service rates, a coding scheme that can achieve the highest peak signal-to-noise ratio (PSNR) for clients is desired. Also, for a given quality requirement (e.g., PSNR for each bitstream), a coding scheme that can achieve the smallest total bit allocation is desired.

Intuitively, scalable bitstreams (dependently coded bitstreams) are expected to perform better than simulcast coding. This reasoning suggests that a multicast implementation without complexity constraints should only use spatial scalability. However, the present inventors have found that simulcast coding outperforms spatial scalability for certain operating regions. This surprising discovery enables a determination to be made as to which approach to use for a given application and to provide an adaptive switching technique between the two coding approaches.

It would be advantageous to provide an optimal method for selecting between spatial scalability and simulcast coding for multicast video services. Such a method should enable a determination to be made as to whether simulcast coding or spatial scalability should be used to encode video for clients with a specific communication link. It would be further advantageous if, in addition to guiding decisions for specific cases, the methodology could be used to construct decision regions to guide more general scenarios, or used to adaptively switch between the two approaches. Operating points for both simulcast coding and spatial scalability, in terms of bit allocations among clients, should also be determinable by using such a method.

The present invention provides a system having the aforementioned and other advantages.

SUMMARY OF THE INVENTION

An optimal technique is provided for selecting between spatial scalability and simulcast coding to provide an efficient compression algorithm. In particular, simulcast coding can outperform spatial scalability when a small proportion of bits is allocated to the base layer.

A technique is also provided for determining whether simulcast coding or spatial scalability should be used to encode video for clients with a specific communication link. Operating points for both simulcast coding and spatial scalability are also determined. Adaptive switching between the two approaches is also provided, with the operating regions being used to guide the switching.

The invention also provides a method for determining the point of equal quality in both layers of simulcast coding. The proportion of bits allocated to the base layer to achieve equal quality is independent of the total bit rate for both simulcast and spatial scalability.

Corresponding methods and apparatuses are presented.

DETAILED DESCRIPTION OF THE INVENTION

The present invention provides techniques for selecting between simulcast coding and spatial scalability for multicast services, such as multicast video.

A brief review of general scalable coding (temporal scalability in addition to spatial scalability) is first provided. Simulations have been performed with an MPEG-4 codec to gain insight into the issues involved in transmitting the same video sequence at multiple spatial resolutions. In addition to deciding between simulcast coding and spatial scalability, one issue is the proper allocation of bits to the different layers.

General guidelines are provided and a scenario for achieving equal quality in both layers is examined in detail. The results obtained using quarter common intermediate format (QCIF) and common intermediate format (CIF) resolution sequences may be directly applied to applications such as video transmission in a multicast environment.

While QCIF is used as an example of lower-resolution data, and CIF is used as an example of higher-resolution data, these are examples only, and other suitable data formats can be used.

CIF was developed so that computerized video images can be shared from one computer to another. An image that is digitized to CIF has a resolution of 352×288 or 352×240, which is essentially one-half of the resolution of CCIR 601. The CCIR 601 recommendation of the International Radio Consultative Committee for the digitization of color video signals deals with color space conversion from RGB to YCrCb, the digital filters used for limiting the bandwidth, the sample rate (defined as 13.5 MHz), and the horizontal resolution (720 active pixels).

Many applications desire the capability to transmit and receive video at a variety of resolutions and/or qualities. One method to achieve this is with scalable or layered coding, which is the process of encoding video into an independent base layer and one or more dependent enhancement layers. This allows some decoders to decode the base layer to receive basic video and other decoders to decode enhancement layers in addition to the base layer to achieve higher temporal resolution, spatial resolution, and/or video quality.

Figure 1:
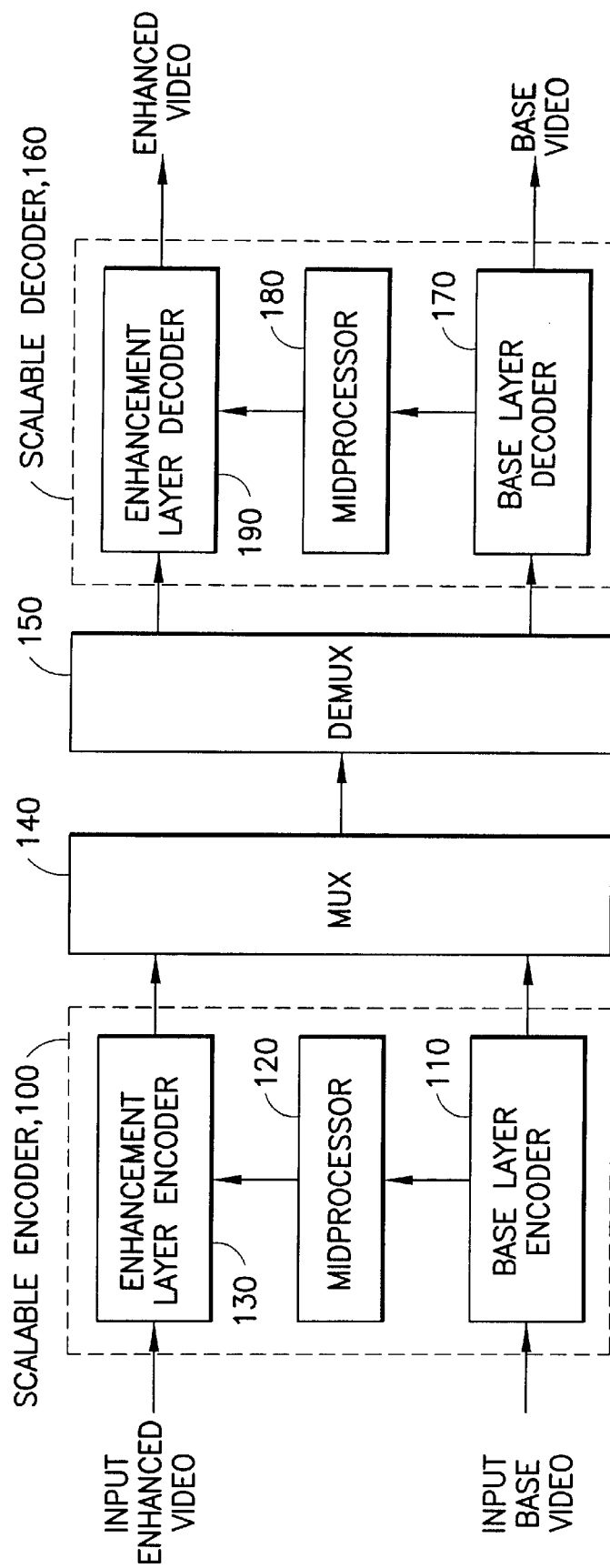
FIG. 1 is a block diagram of a general scalable coder/decoder (CODEC) with two layers.

The general concept of scalability is illustrated in FIG. 1 for a codec with two layers. Note that additional layers can be used. The scalable encoder 100 takes two input sequences and generates two bitstreams for multiplexing at a mux 140. Specifically, the input base video stream or layer is processed at a base layer encoder 110, and upsampled at a midprocessor 120 to provide a reference image for predictive coding of the input enhanced video stream or layer at an enhancement layer encoder 130.

Note that coding and decoding of the base layer operate exactly as in the non-scalable, single layer case. In addition to the input enhanced video, the enhancement layer encoder uses information about the base layer provided by the midprocessor to efficiently code the enhancement layer. After communication across a channel, which can be, e.g., a computer network such as the Internet, or a broadband communication channel such as a cable television network, the total bitstream is demultiplexed at a demux 150, and the scalable decoder 160 simply inverts the operations of the scalable encoder 100 using a base layer decoder 170, a processor 180, and an enhancement layer decoder 190.

The MPEG-2 standard defines scalable tools for spatial, temporal and quality (SNR) scalability. The main commercial applications that MPEG-2 was targeted to were digital video disks and digital television, applications where the additional functionality of scalability is often not used. Thus, there has been limited commercial interest in MPEG-2 scalable coding in the past. However, new applications such as streaming video could greatly benefit from scalability. One example where scalable coding may be useful is for video transmission in a multicast environment. Clients have a wide range of processing power, memory resources and available bandwidth. This requires a server to provide different resolutions and/or qualities of video to be able to satisfy the different capabilities of their clients. The recently completed multimedia standard MPEG-4 version 1 offers two types of scalability: temporal and spatial. In addition to applying scalability to frames (pictures) of video, the standard also defines scalability for arbitrary shaped objects.

This document focuses on frame-based scalability, although the concepts of the invention are generally applicable to arbitrarily shaped objects. In addition to temporal and spatial scalability, a third type of scalable coding for quality scalability called Fine Granular Scalability (FGS) is currently being evaluated for inclusion in MPEG-4. A brief review of temporal and spatial scalability in MPEG-4 is presented before discussion of simulcast coding.

Temporal scalability permits an increase in the temporal resolution by using one or more enhancement layers in addition to the base layer.

Figure 2:
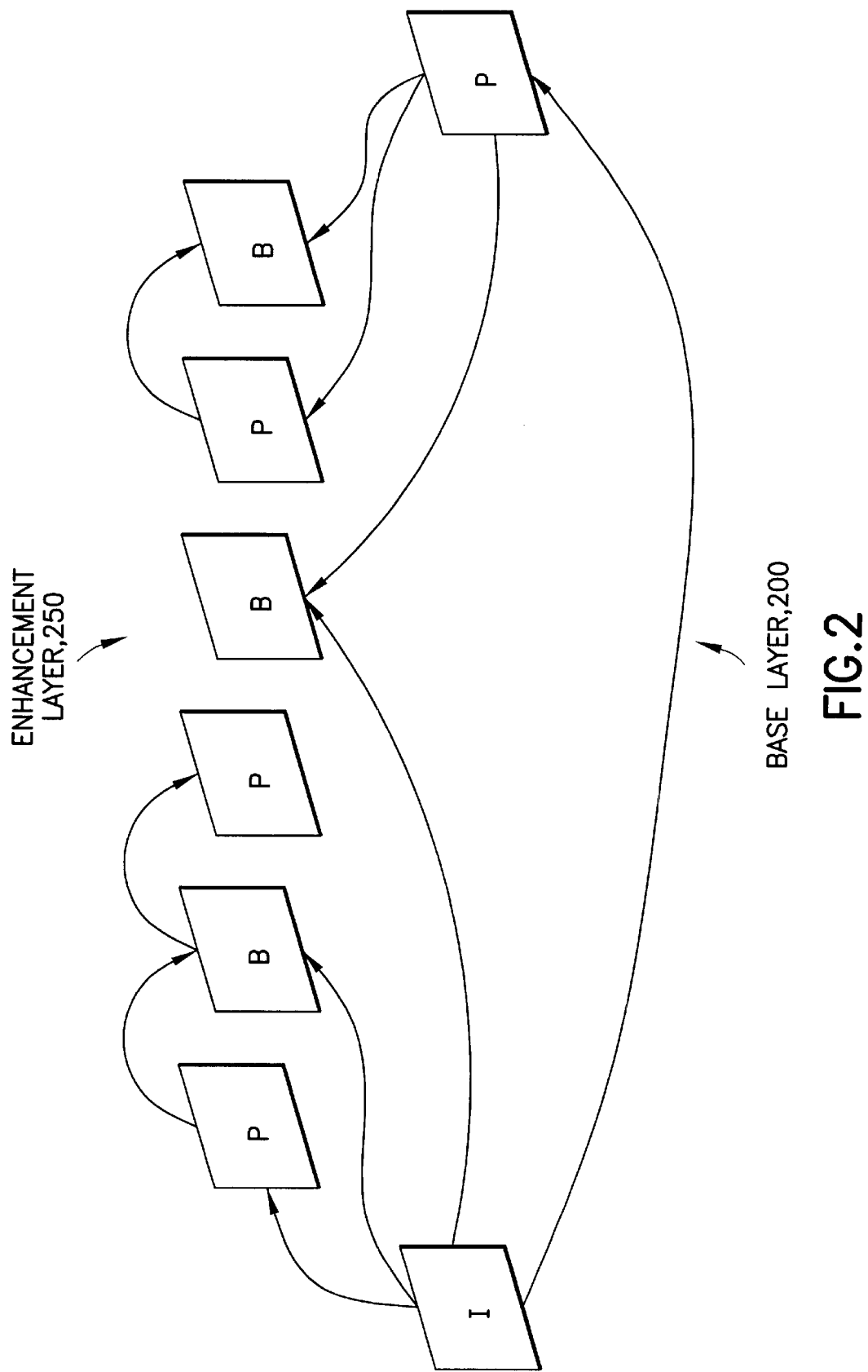
FIG. 2 illustrates temporal scalability with two layers.

FIG. 2 shows an example of temporal scalable coding with two layers. Basic video is obtained by decoding only the independent base layer 200, which is done in the same manner as in the non-scalable, single layer case. Use of the dependent enhancement layer 250 provides video with, e.g., seven times the temporal resolution of the basic video. The same spatial resolution is obtained whether or not the enhancement layer 250 is used. A frame in the enhancement layer 250 can use motion compensated prediction from the previous or next frame in display order belonging to the base layer as well as the most recently decoded frame in the same layer.

Figure 3:
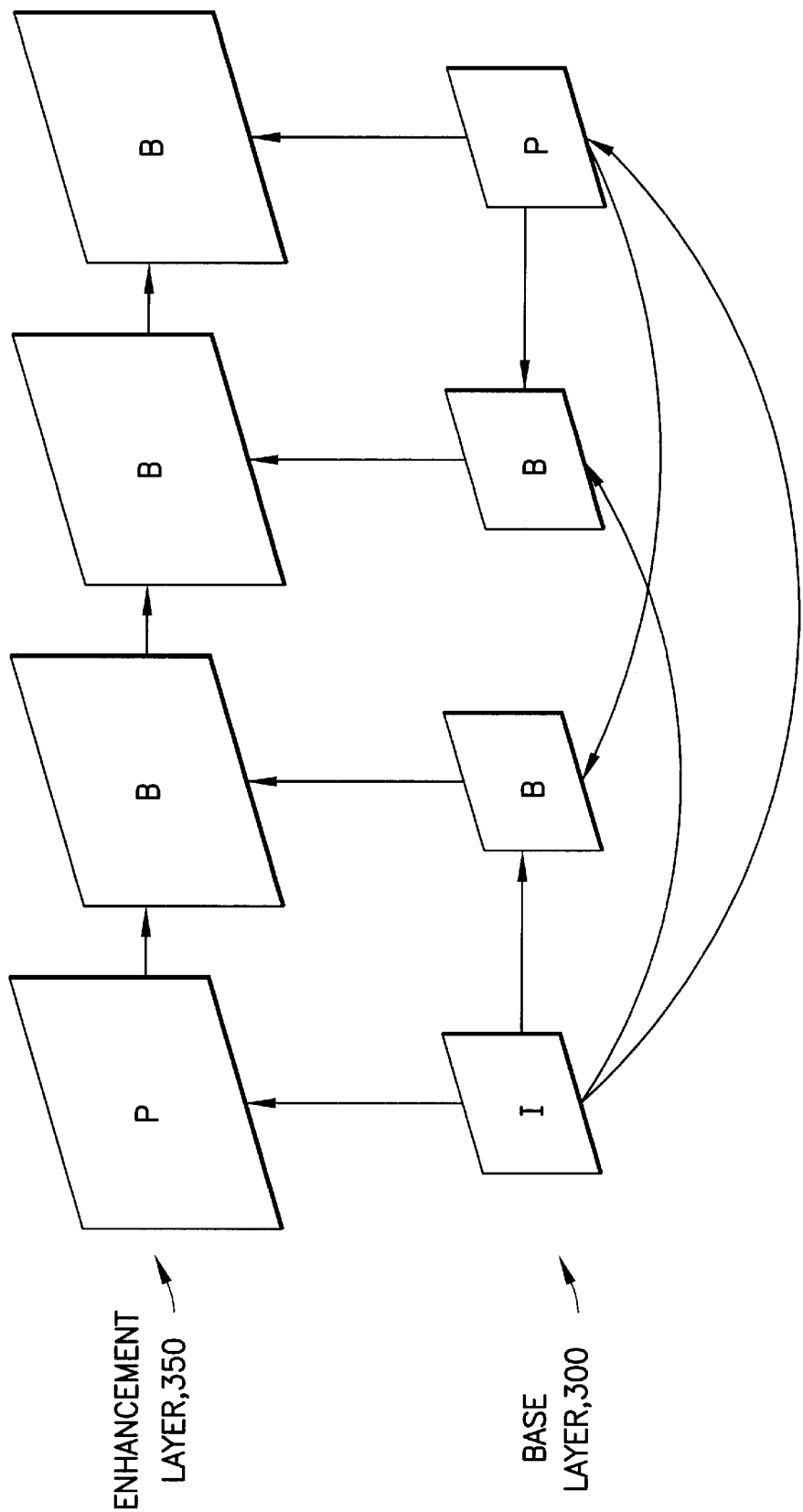
FIG. 3 illustrates spatial scalability with two layers.

Spatial scalability permits an increase in the spatial resolution by using enhancement layers in addition to the base layer. FIG. 3 shows an example of spatial scalable coding with two layers. Basic video is obtained by decoding only the independent base layer 300, which is done in the same manner as in the non-scalable, single layer case. Use of the dependent enhancement layer 350 provides video with, e.g., twice the spatial resolution of the basic video. The same temporal resolution is obtained whether or not the enhancement layer is used. A frame in the enhancement layer can use motion compensated prediction from the temporally coincident frame in the base layer as well as the most recently decoded frame in the same layer.

Figure 4:
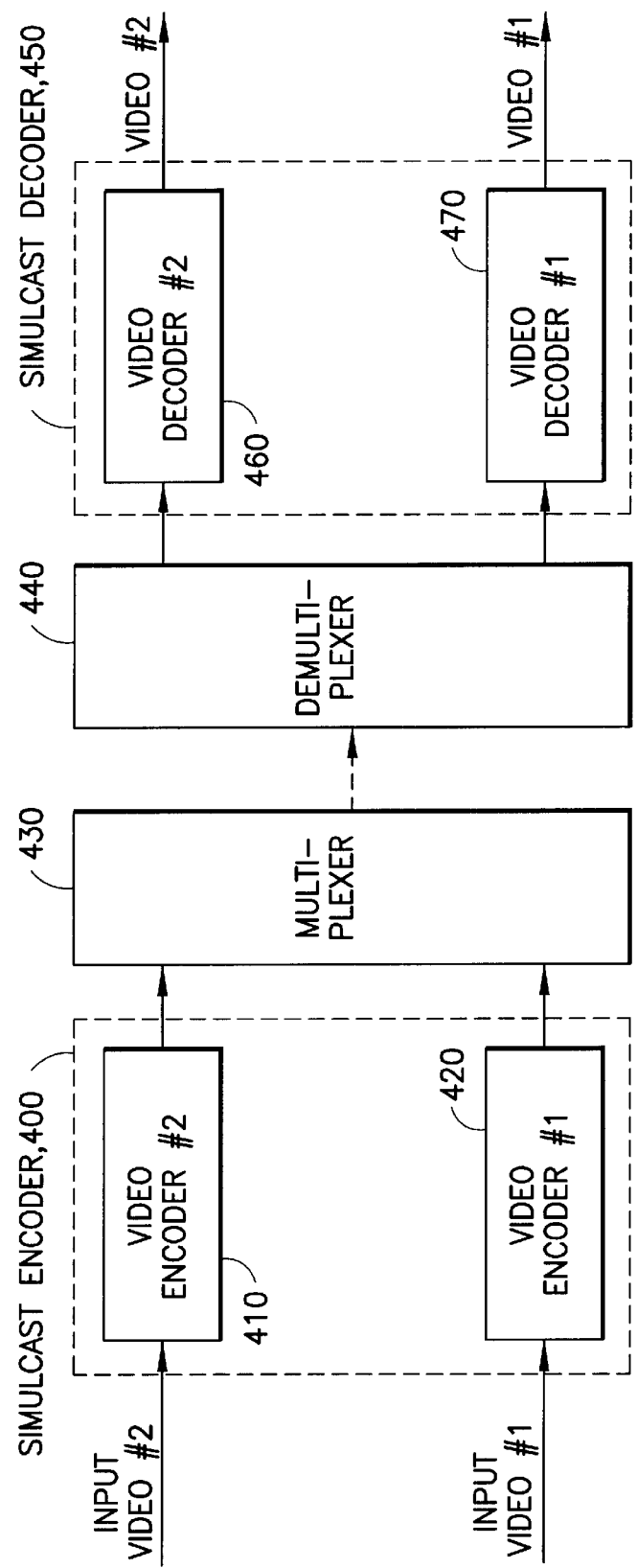
FIG. 4 is a block diagram of a system for providing simulcast coding with two bitstreams.

Another method to transmit video at multiple resolutions or qualities is simulcast coding. FIG. 4 shows an example of simulcast coding with two bitstreams. For simulcast coding, the streams are independent, whereas scalable coding usually refers to an independent base layer with one or more dependently-coded enhancement layers. For comparison with scalable coding, one of the simulcast streams (termed a lower-resolution stream) has the same resolution as the base layer, and the other simulcast bitstream (termed a higher-resolution stream) has the same resolution as the enhancement layer.

First and second input bitstreams are coded at corresponding video encoders 420 and 410, respectively. The input video #1 is assumed to be a lower-resolution stream, while the input video #2 is assumed to be a higher-resolution stream. This involves coding each representation independently and is usually less efficient than scalable coding since similar information in another bitstream is not exploited. The bitstreams are then multiplexed at a mux 430, transmitted across some channel, demultiplexed at a demux 440, and decoded independently at video decoders 470 and 460, respectively, in a simulcast decoder 450. Unlike scalable coding, no additional decoder complexity is required to decode the higher-resolution video. This may be important for commercial applications since additional decoder complexity often increases the cost of receivers.

This invention focuses on the performance of spatial scalability and its simulcast counterpart. Simulations have been performed with an MPEG-4 encoder on rectangular video to gain insight into the issues with transmitting video at a variety of spatial resolutions. One issue with layered coding is the proper allocation of bits between layers. In addition to examining the differences between simulcast coding and spatial scalability, investigations in connection with the invention focus on determining guidelines for bit allocation.

Six different video sequences were examined, namely Basket, Bus, Carphone, Foreman, News, and Silentvoice. This set of sequences has a wide range of complexity, so the results should be generally applicable to other sequences. The Basket and Bus sequences have a large amount of motion and may stress most encoders. The News and Silentvoice sequences have large stationary backgrounds making them easy to compress efficiently. The original sequences were in CIF format (288×352 pixels) and QCIF format (144×176 pixels). The sequences were created by downsampling (without use of any anti-aliasing filter, i.e., decimation). Each sequence was 150 frames long and the source material and display frame rates were 30 frames per second. An MPEG-4 encoder was used to encode the simulcast and spatial scalable streams at various fixed quantization levels with no rate control. The parameters used for the simulations are shown in Table 1. "VOP" refers to a Video Object Plane, as known from the MPEG-4 standard.

TABLE 1

Parameters of Simulations

|  | Lower Layer of Simulcast Streams | Upper Layer of Simulcast Streams | Base Layer of Scalable Streams | Enhancement Layer of Scalable Streams |
|---|---|---|---|---|
| $Q_I$ | {4, 6, 8, . . . , 24} | {4, 6, 8, . . . , 24} | {4, 6, 8, . . . , 24} | {6, 8, 10, . . . , 24} |
| $Q_P$ | min (1.4$Q_I$, 32) | min (1.4$Q_I$, 32) | min (1.4$Q_I$, 32) | min (1.4$Q_I$, 32) |

TABLE 1-continued

Parameters of Simulations

| | Lower Layer of Simulcast Streams | Upper Layer of Simulcast Streams | Base Layer of Scalable Streams | Enhancement Layer of Scalable Streams |
|---|---|---|---|---|
| $Q_B$ | min (1.8$Q_I$, 32) | min (1.8$Q_I$, 32) | min (1.8$Q_I$, 32) | min (1.8$Q_I$, 32) |
| Structure | IPPBPPB . . . | IPPBPPB . . . | IPPBPPB . . . | PBBPBBPBB . . . |
| M | 3 | 3 | 3 | 12 |
| N | 12 | 12 | 12 | — |
| Range | 8 | 16 | 8 | 16 |
| $Q_I$ | | Quantizer for I-VOPs | | |
| $Q_P$ | | Quantizer for P-VOPs | | |
| $Q_B$ | | Quantizer for B-VOPs | | |
| Structure | | Picture Structure | | |
| M | | Period between consecutive P-VOPs | | |
| N | | Period between consecutive I-VOPs | | |
| Range | | Search range for motion vectors | | |

The measure of quality here is the PSNR, which is defined to be the Peak Signal-to-Noise Ratio of the luminance (Y) component of the decoded video compared to the input video at the same resolution. While PSNR is the quality measure used here, other possible measures include, e.g., MSE (Mean Square Error) and a Perceptual Distortion Measure. PSNR as used here is defined to be 20*log10 (MSE) (dB).

Single Layer Coding

Figure 5:
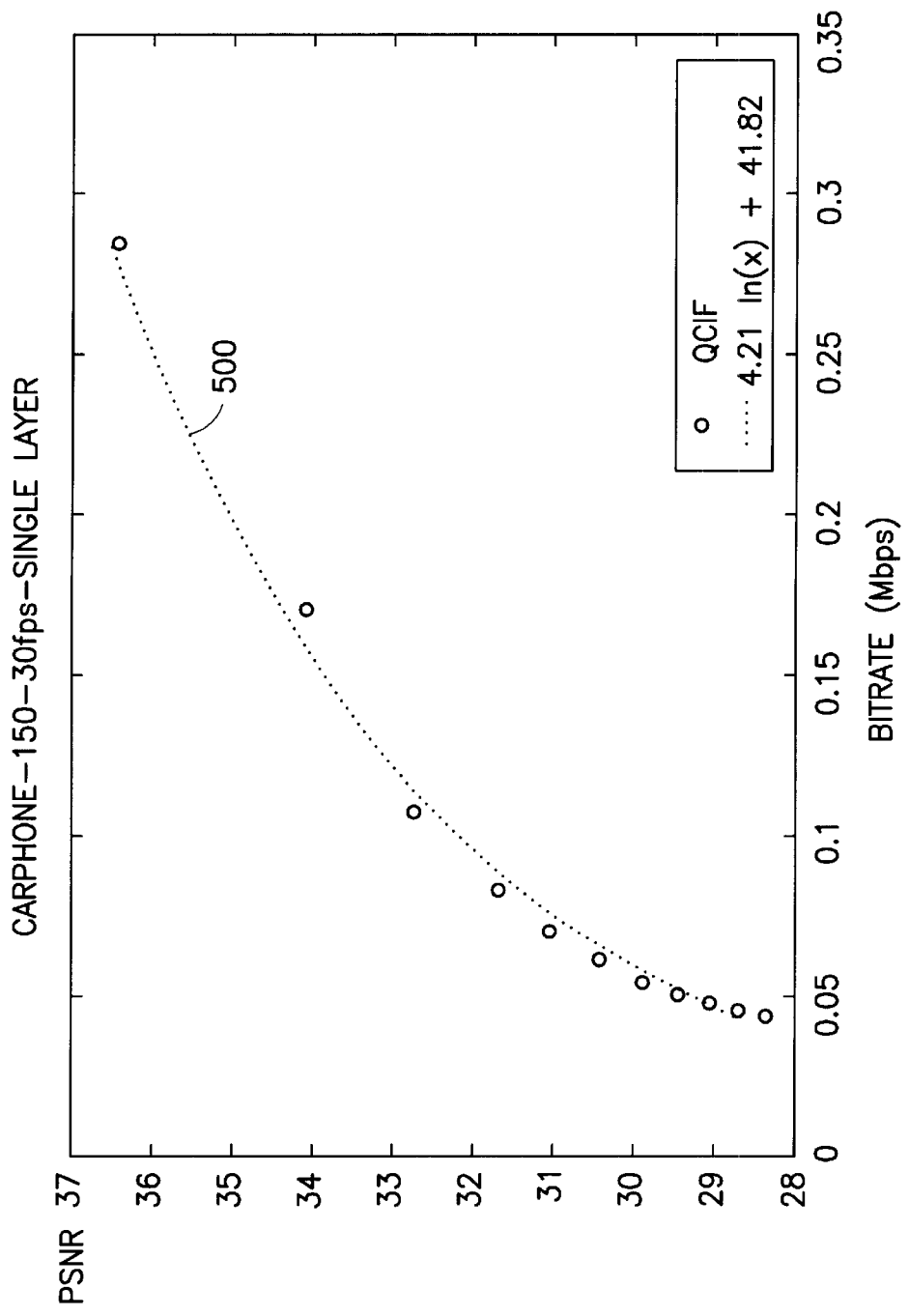
FIG. 5 is a plot of PSNR vs. bit rate for the single layer coding of the QCIF carphone video sequence.
Figure 6:
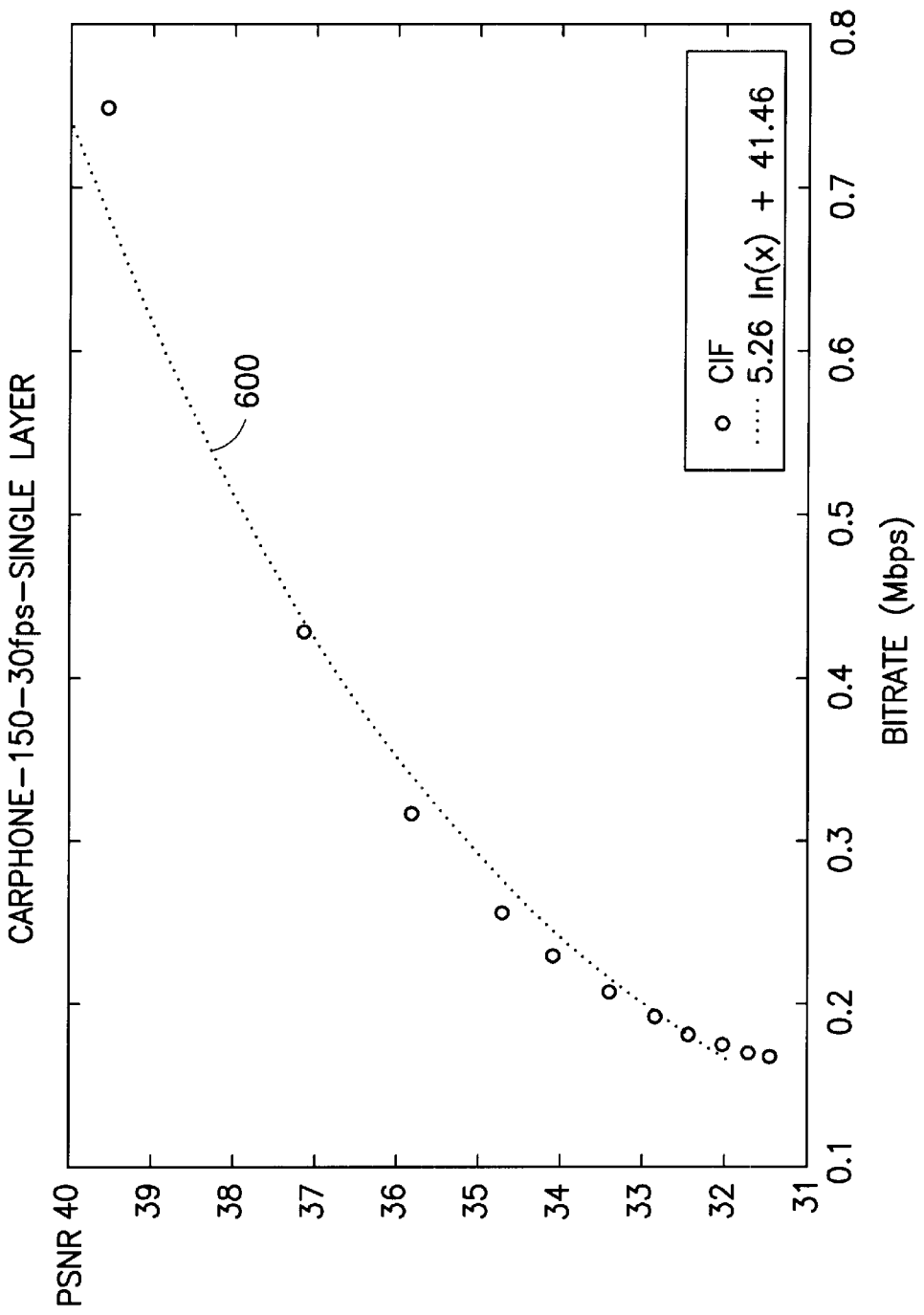
FIG. 6 is a plot of PSNR vs. bit rate for the single layer coding of the CIF carphone video sequence.

Single layer coding results for the QCIF and CIF Carphone sequences are shown in FIG. 5 and FIG. 6. The legend "150-30 fps" indicates a sequence of 150 frames at 30 frames per second. Note that 150 frames was an arbitrarily chosen length and many suitable sequence lengths could be used. Conceptually, switching between spatial scalability and simulcast coding can occur as frequently as at every picture. However, this may result in syntax problems. Switching between groups of pictures (GOPs) is a realistic possibility.

Moreover, here and in the other figures, the bit rate is an average bit rate over a sequence. The circles denote the empirical results and the dotted lines 500, 600, respectively, represent logarithmic fits to the data using the following model:

$$PSNR = A \ln(\text{Bitrate}) + B.$$

The model allows each single layer to be represented by two parameters (constants) A and B (along with the range of bit rates where this model is valid). "ln" denotes the natural logarithm. "Bitrate" is the "x" parameter in the figures.

Simulcast Coding

A typical scenario encountered when transmitting multiple sequences is a constraint on the total bandwidth.

Figure 7:
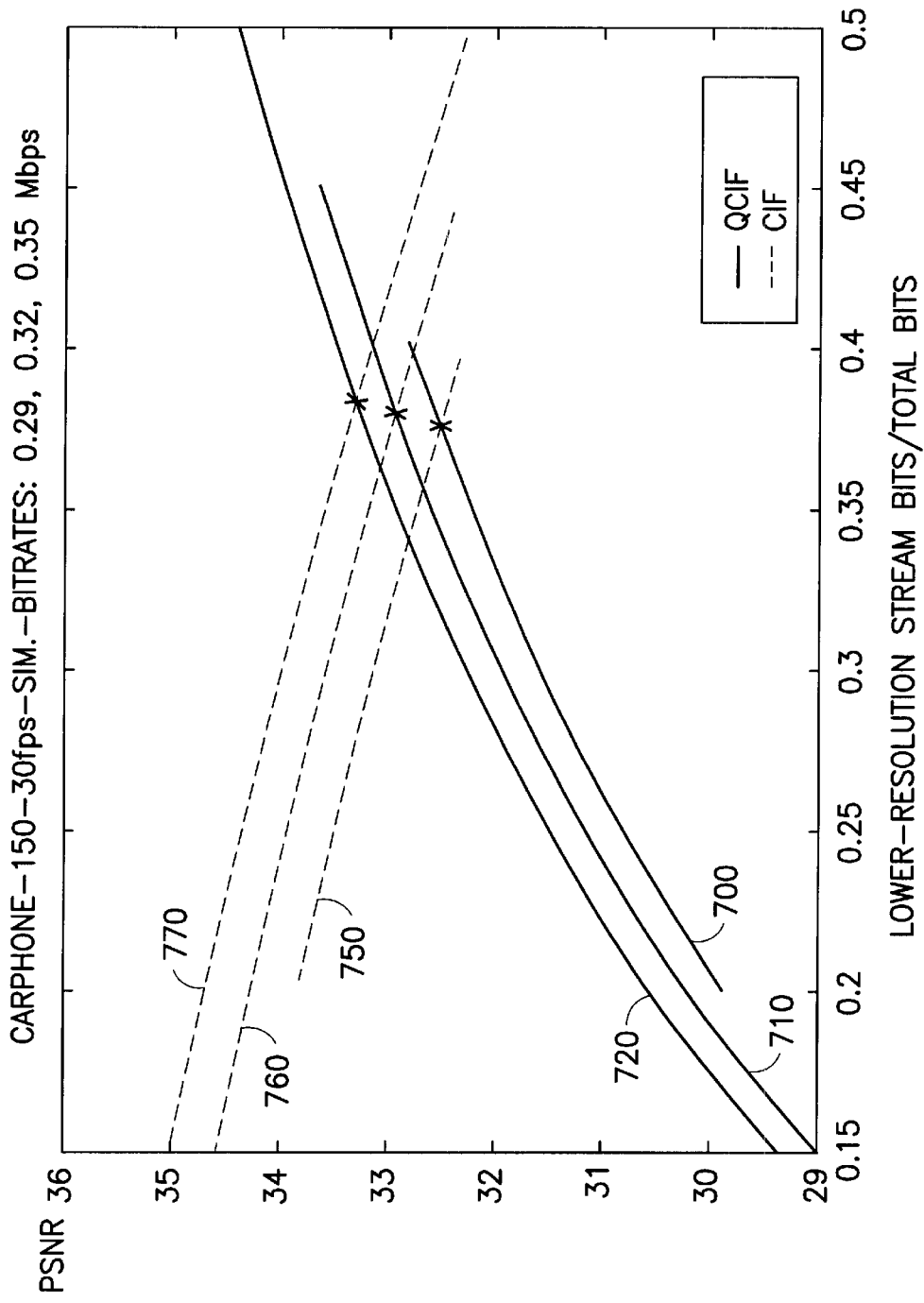
FIG. 7 is a plot of PSNR vs. vs. the fraction of total bits allocated to the lower-resolution stream, for QCIF/CIF simulcast of the carphone video sequence for total bit rates of 0.29, 0.32, and 0.35 Mbps.

FIG. 7 is a plot of PSNR vs. fraction of total bits allocated to the lower-resolution stream, for a total bandwidth of 0.29, 0.32, and 0.35 Mbps for QCIF/CIF simulcast. The figure shows examples of the different qualities that can be achieved by limiting the total bandwidth to 0.29, 0.32 and 0.35 Mbps, respectively, for simulcast ("Sim.") transmission of the Carphone QCIF and CIF sequences. Both qualities are plotted as functions of the fraction of total bits allocated to the lower-resolution stream (i.e., the QCIF stream). In particular, the solid lines 700, 710, 720 represent the PSNR of the lower-resolution (QCIF) sequence for total bit rates of 0.29, 0.32, and 0.35 Mbps, respectively. The dotted lines 750, 760, 770 represent the PSNR of the higher-resolution (CIF) sequence for total bit rates of 0.29, 0.32, and 0.35 Mbps, respectively.

Note the monotonicity of the data for both layers. That is, the PSNR either increases or decreases steadily (without a peak or valley).

While some of the figures refer to the fraction of bits that are allocation to the base layer or enhancement layer (for SS), or to the lower-resolution stream or higher-resolution stream (for Sim.), note that these values can also be expressed in terms of an absolute number of bits, a percentage, a fraction or percentage of a fixed reference value, or any other linear or non-linear metric or scale.

The independence of the single streams in simulcast coding causes an improvement in quality with an allocation of more bits to the QCIF stream, and degradation of the other, (CIF) stream. This makes sense since the additional bits that are given to one stream are taken away from the other stream to maintain the same total bandwidth.

The curve crosses in the figures denote the point where the functions intersect, i.e., the point where the PSNR of both streams is equal. This point can be found using the logarithmic fits to the data of each stream and a bisection algorithm since the PSNR of each stream is a monotonic function of the bit rate of the lower-resolution stream.

In particular, the monotonicity of the PSNR for both layers implies that if the functions intersect, they will intersect at only one point. In some cases, there may be no intersection point due to insufficient or excess total bandwidth. An additional exit condition checking the difference in bit rates can be used to determine if there is no intersection. This has been omitted from the following algorithm for simplicity. Therefore, the algorithm below assumes that a proper total bit rate has been selected allowing the functions to intersect. A bisection algorithm using the difference in PSNR between the layers can be used to find the point of equal quality. An example algorithm follows:

1. Assume fixed total bitrate $R_{TOT}$ and a threshold for convergence T>0.
2. Let $R_1$ and $R_2$ be the minimum and maximum bitrates for single layer coding of the lower layer.
3. Let $$R_3 = \frac{R_1 + R_2}{2}.$$

4. Compute $PSNR_{lower}$ and $PSNR_{upper}$ for $R_3$ using the logarithmic fits to each layer:

$$PSNR_{lower} = A_{lower} \ln(R_3) + B_{lower}$$

$$PSNR_{upper} = A_{upper} \ln(R_{TOT} - R_3) + B_{upper}$$

where $A_{lower}$ and $B_{lower}$ are the parameters for the lower (lower-resolution) layer and $A_{upper}$ and $B_{upper}$ are the parameters for the upper (higher-resolution) layer.

5. Let $DIFF = PSNR_{lower} - PSNR_{upper}$.

6. If the absolute value of DIFF is less than T, the algorithm is finished and $R_3$ is the lower layer bitrate to achieve equal quality in both layers of simulcast coding. Otherwise, Set $R_1 = R_3$ if DIFF<0.

Set $R_2 = R_3$ if DIFF>0.

Go back to step 3.

This algorithm is just one example of how the crossover point can be found. Other techniques are possible, such as a linear interpolation.

Figure 8:
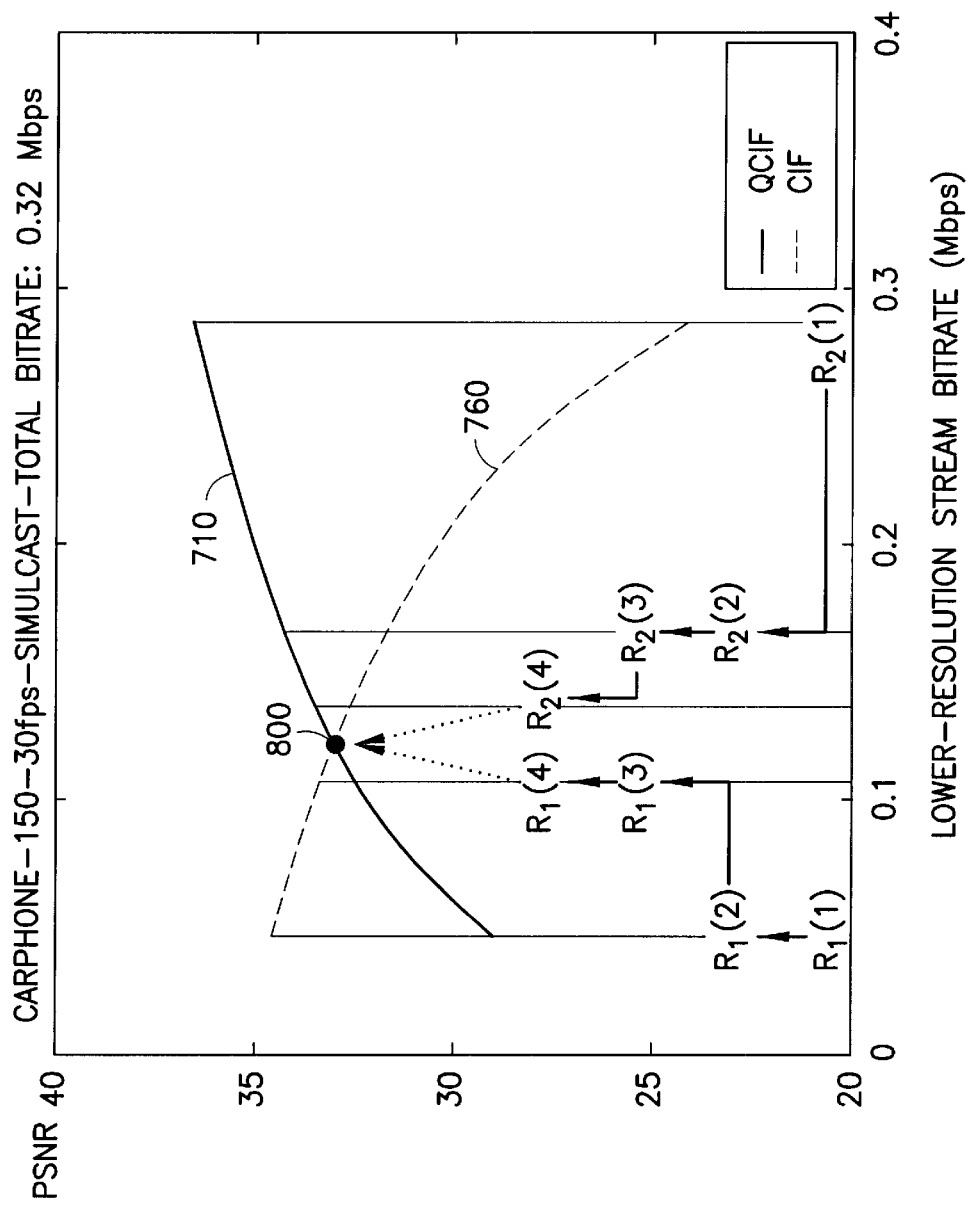
FIG. 8 is a plot illustrating an example of the iterations needed to obtain the point of equal quality in both layers of simulcast coding for the QCIF/CIF carphone video sequence.

FIG. 8 gives an example of the iterations needed to obtain the point 800 of equal quality in both streams of the QCIF/CIF simulcast coding of the carphone sequence, for the 0.32 Mbps case. $R_1(i)$ and $R_2(i)$ represent the bit rates $R_1$ and $R_2$, respectively, for the lower-resolution stream at iteration i of the algorithm. Note that FIG. 8 shows the absolute bit rate of the lower-resolution stream, whereas FIG. 7 shows the fraction of the total bits that are allocated to the lower-resolution stream. It should be easily understood here and elsewhere how to convert between these two types of scales.

The point where the PSNRs intersect in FIG. 7 can be interpreted as the bit allocation where both streams are coded at approximately the same quality since PSNR is normalized with respect to picture size. Note that this point may not occur with some total bandwidths due to the limited dynamic range of each stream's coding.

The ability to transmit two streams of different resolutions that have roughly the same quality may be desirable in applications such as streaming video over the Internet with the resolutions used here. However, other applications may have different requirements. For example, consider two different agendas for the same simulcast system. One application may desire relatively higher quality in the lower-resolution stream to satisfy a larger number of receivers receiving the lower resolution. Another application may desire a relatively higher quality in the higher-resolution streams to satisfy the receivers receiving the higher resolution because of the higher cost of the bandwidth required to receive the entire simulcast stream. The analysis in the following sections focuses on achieving the same quality for both streams, but this may not be the goal of some applications and this issue is revisited hereinbelow.

Additionally, FIG. 7 illustrates that the fraction of bits allocated to the lower-resolution stream to achieve equal quality in the two streams is essentially independent of the total bit rate. This is a very useful result and its significance can be seen by the following example. Assume that a multiplexer is combining simulcast bitstreams and has already determined the proper bit allocation between streams. The preceding result suggests that the multiplexer does not have to redetermine the proper bit allocation when reacting to a change in the total bandwidth. Instead, the proportion of bits allocated to each stream should remain the same.

Figure 9:
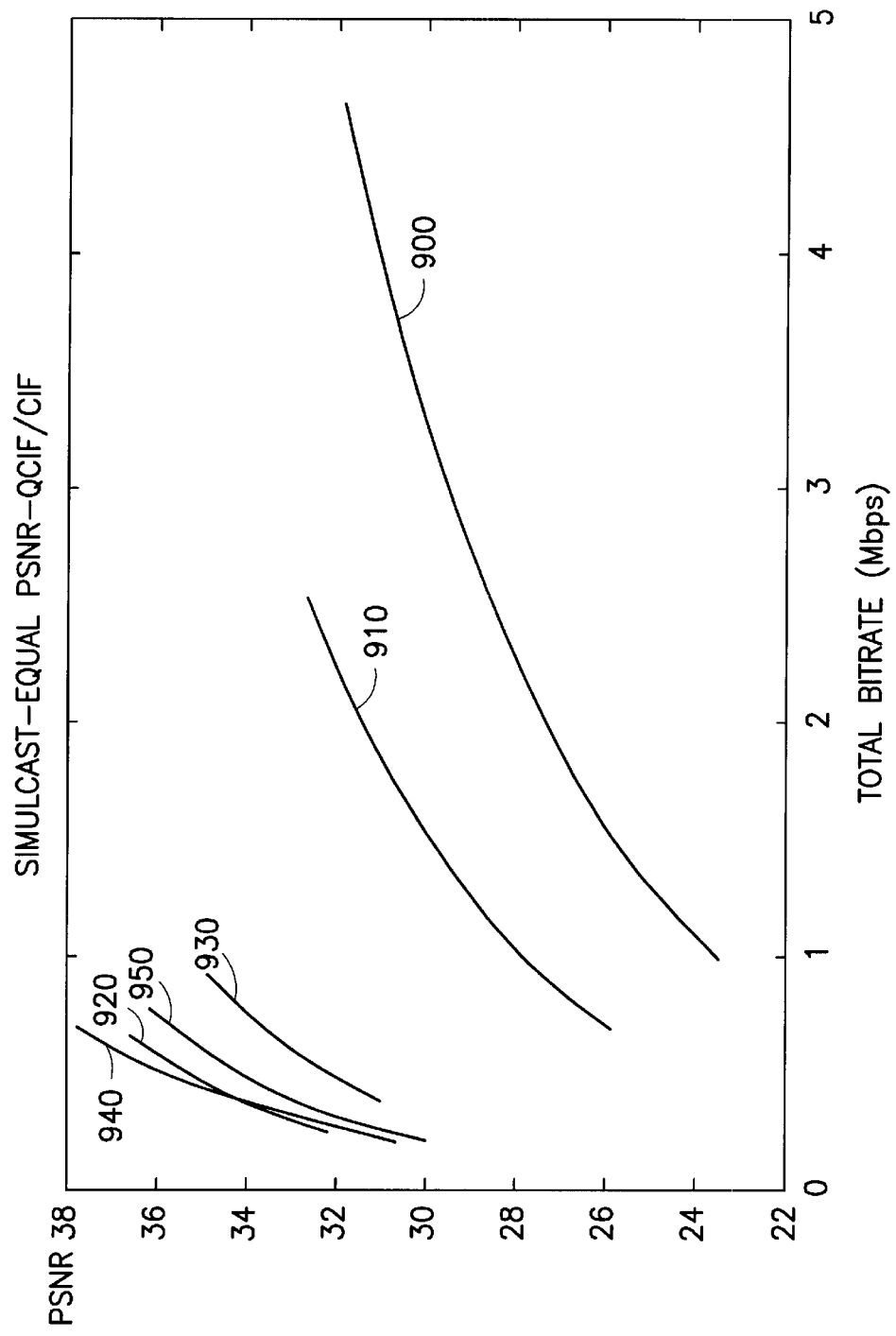
FIG. 9 is a plot of PSNR vs. total bit rate for a QCIF/CIF simulcast, where the lower-resolution stream and higher-resolution stream have the same PSNR for a given total bitrate.
Figure 10:
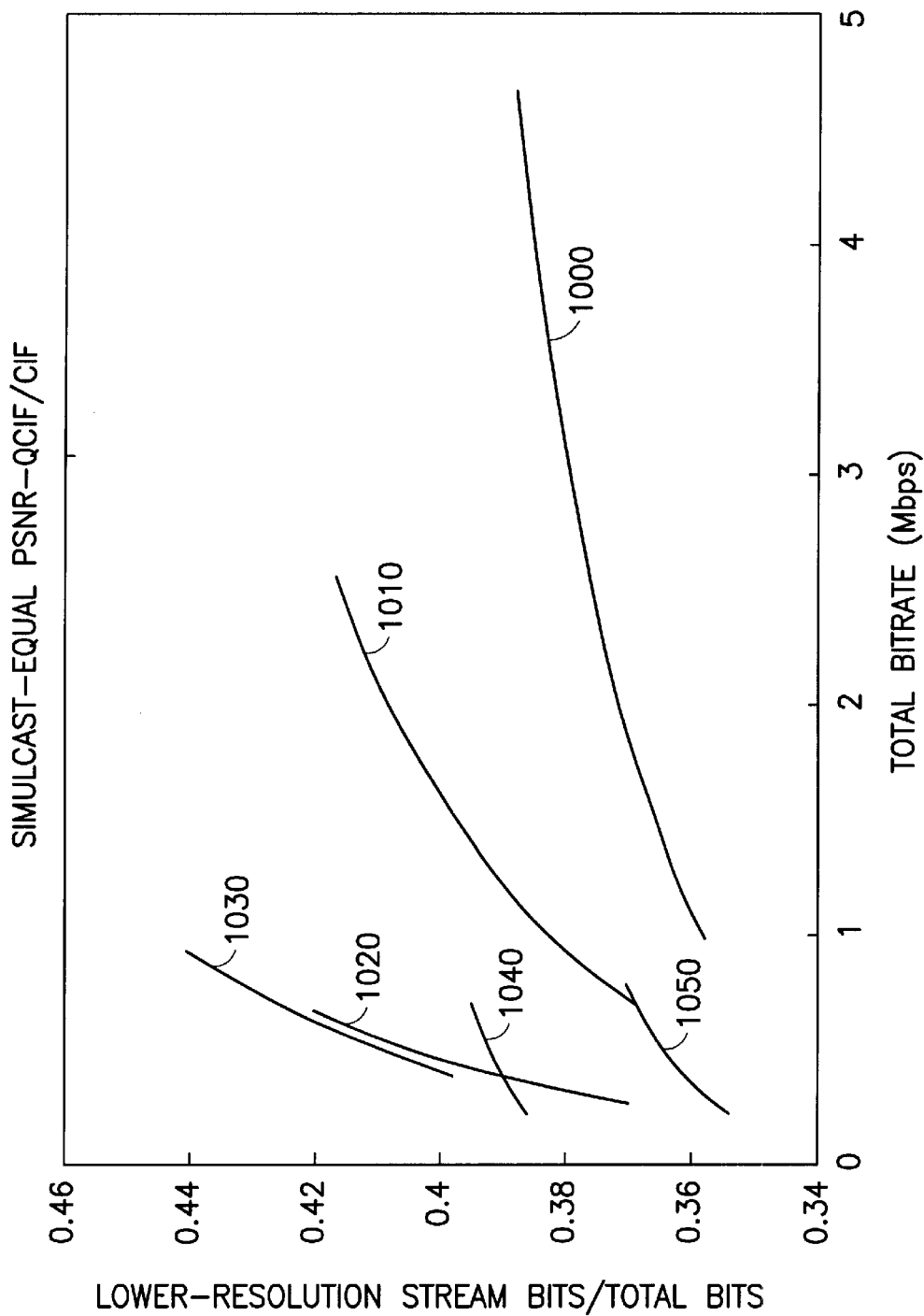
FIG. 10 is a plot of the fraction of total bits allocated to the lower-resolution stream vs. the total bit rate for a QCIF/CIF simulcast, where the lower-resolution stream and higher-resolution stream have the same PSNR for a given total bitrate.

FIGS. 9 and 10 show the results of performing the same analysis as described above for different sequences at a wide variety of constrained total bandwidths. In particular, FIG. 9 shows the PSNR versus bitrate for the test sequences Basket 900, Bus 910, Carphone 920, Foreman 930, News 940, and Silentvoice 950.

The quality of both the lower-resolution (QCIF) and higher-resolution (CIF) streams is shown by only one curve for each sequence since the data in this plot was obtained by requiring equal PSNR for both streams, and the bitrate shown is the total bitrate. For example, for the Basket sequence 900, when the total bitrate is 1 Mbps, both streams have a PSNR of approximately 24 dB. As the total bitrate is slowly increased, the PSNR of both streams increases, up to approximately 32 dB when the total bit rate is 4.5 Mbps.

FIG. 10 shows the fraction of total bits allocated to the lower-resolution streams versus total bitrate for the test sequences Basket 1000, Bus 1010, Carphone 1020, Foreman 1030, News 1040, and Silentvoice 1050. The data show that approximately 40±4% of the total bandwidth should be allocated to the lower-resolution stream to achieve equal quality in both streams of simulcast coding. This result can be used as a general guide for the bit allocatin of simulcast bitstreams.

Spatial Scalable Coding

Figure 11:
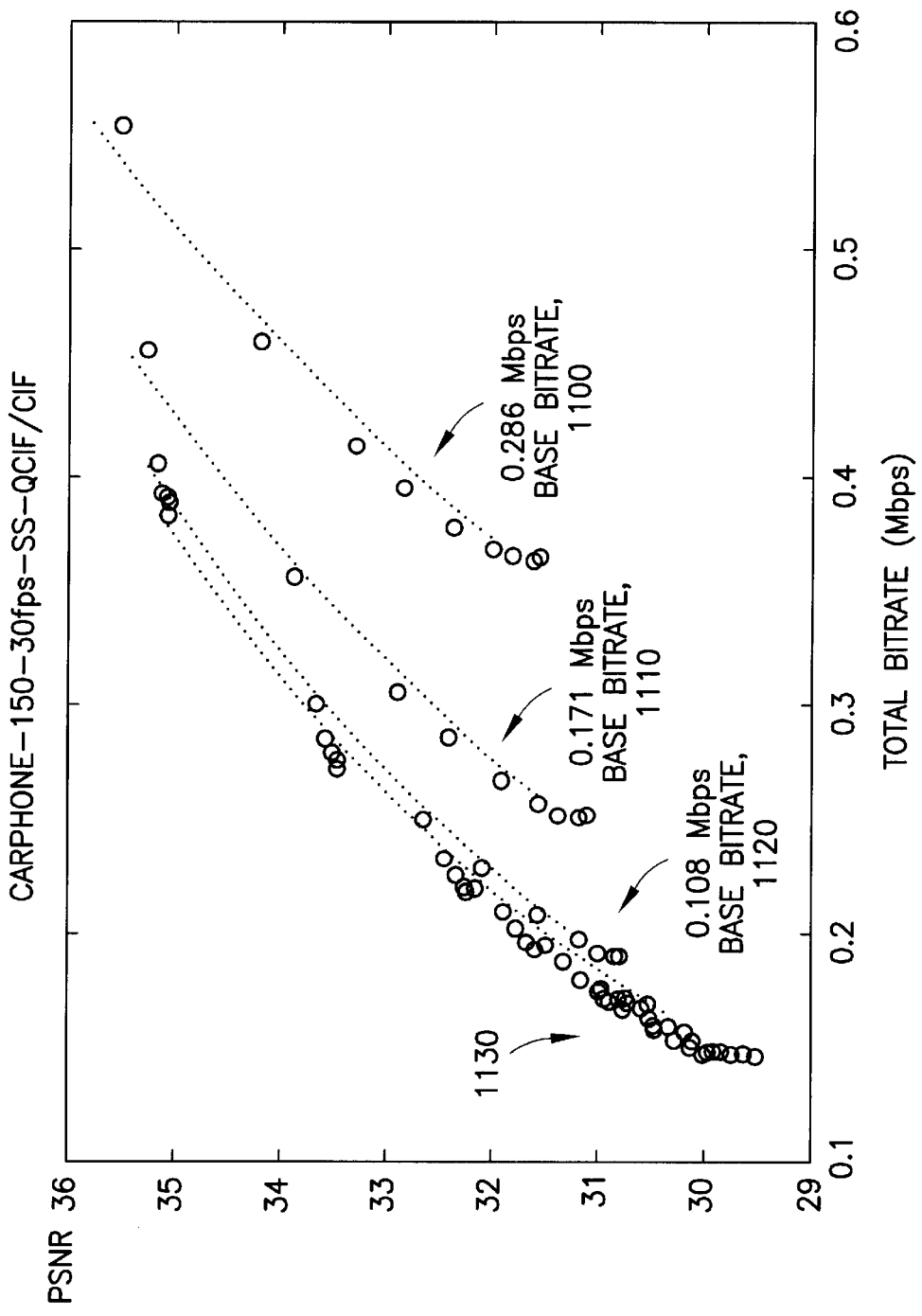
FIG. 11 is a plot of PSNR vs. total bit rate for QCIF/CIF spatial scalable coding of the carphone video sequence.

Results for the spatial scalable ("SS") coding of the Carphone QCIF and CIF sequences are shown in FIG. 11. The abscissa of each data point (on the horizontal axis) is the total bit rate of both streams, and the ordinate (on the vertical axis) represents the PSNR of the enhancement layer (the higher, CIF resolution) using spatial scalability. Each set of curves uses the same lower-resolution QCIF base layer (and therefore base layer bit rate and PSNR) with different enhancement layer bit rates. The circles denote empirical results, and the dotted lines are logarithmic fits to each set of curves using the same base layer. Table 2 lists the bit rate (in Mbps) and PSNR of the QCIF base layer as well as the parameters (A and B) of the logarithmic fit (Y=A ln(X)+B) for each set of curves.

TABLE 2

Base (QCIF) Layer
Characteristics of Spatial Scalable
Coding for QCIF/CIF (Carphone)

| Base Bitrate (Mbps) | Base PSNR | A | B |
|---|---|---|---|
| 0.286 | 36.46 | 9.40 | 41.34 |
| 0.171 | 34.11 | 6.89 | 40.90 |
| 0.108 | 32.73 | 5.70 | 40.45 |
| 0.0835 | 31.69 | 5.36 | 40.26 |
| 0.0714 | 31.04 | 5.32 | 40.26 |
| 0.0625 | 30.46 | 5.36 | 40.34 |
| 0.0561 | 29.92 | 5.40 | 40.41 |
| 0.0518 | 29.48 | 5.47 | 40.49 |
| 0.0492 | 29.09 | 5.55 | 40.53 |
| 0.0472 | 28.76 | 5.62 | 40.61 |
| 0.0456 | 28.44 | 5.66 | 40.62 |

In FIG. 11, the 0.286, 0.171, and 0.108 base layer bit rates are shown at curves 1100, 1110, and 1120, respectively. The remaining bit rates of 0.0835 through 0.0456 are shown at the aggregate curves 1130.

Figure 12:
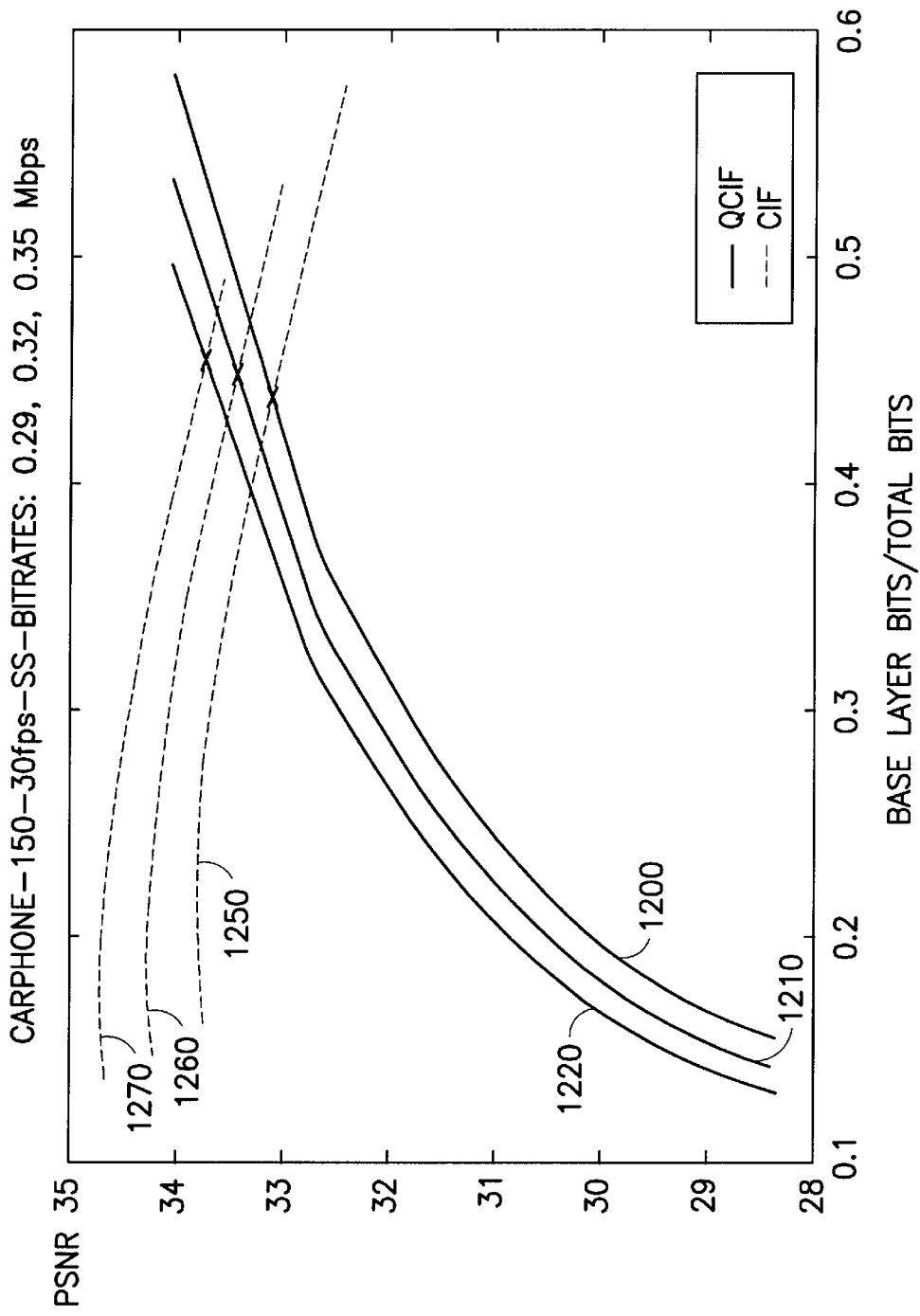
FIG. 12 is a plot of PSNR vs. the fraction of total bits allocated to the base layer, for QCIF/CIF spatial scalable coding of the carphone video sequence for total bit rates of 0.29, 0.32 and 0.35 Mbps.

A constraint on the total bandwidth is examined for spatial scalable coding of the Carphone QCIF and CIF sequences. FIG. 12 is a plot of PSNR vs. the fraction of total bits allocated to the base layer, for total bandwidths of 0.29, 0.32 and 0.35 Mbps for QCIF/CIF spatial scalability. The figure shows examples of the different qualities that can be achieved by limiting the total bandwidth to 0.29, 0.32 and 0.35 Mbps. The solid lines represent the PSNR of the base layer (QCIF) sequence and the dotted lines represent the PSNR of the enhancement layer (CIF) sequence. In particular, the solid lines 1200, 1210, 1220 represent the PSNR of the QCIF sequence for 0.29, 0.32, and 0.35 Mbps, respectively. The dotted lines 1250, 1260, 1270 represent the PSNR of the CIF sequence for 0.29, 0.32, and 0.35 Mbps, respectively.

Note the PSNR of the CIF sequences is not a monotonic function of the fraction of bits allocated to the base layer. That is, there is a peak in the PSNR for the CIF sequences near 20%.

As expected, the PSNR of the QCIF sequence is a monotonically increasing function of the fraction of total bits allocated to it. Moreover, it appears that allocating less than approximately 20% of the total bitstream to the base layer gives declining performance in both layers. The decline is relatively slight for the CIF layer, but rather sharp for the QCIF layer. This trend is also present with the other test sequences. This result is different from the one seen in the simulcast approach, where both layers are independent, and is due to the dependence of the CIF enhancement layer on the upsampled QCIF base layer. This result of 20% allocation for the base layer can be a useful minimum boundary for the allocation of base layer bits for spatial scalable encoders.

Additionally, FIG. 12 shows that the fraction of bits allocated to the base layer to achieve equal quality in the two layers is essentially independent from the total bit rate. This result is similar to the conclusions obtained after analysis of the simulcast experiments and can be very useful for allocating spatial scalable bitstreams.

Figure 13:
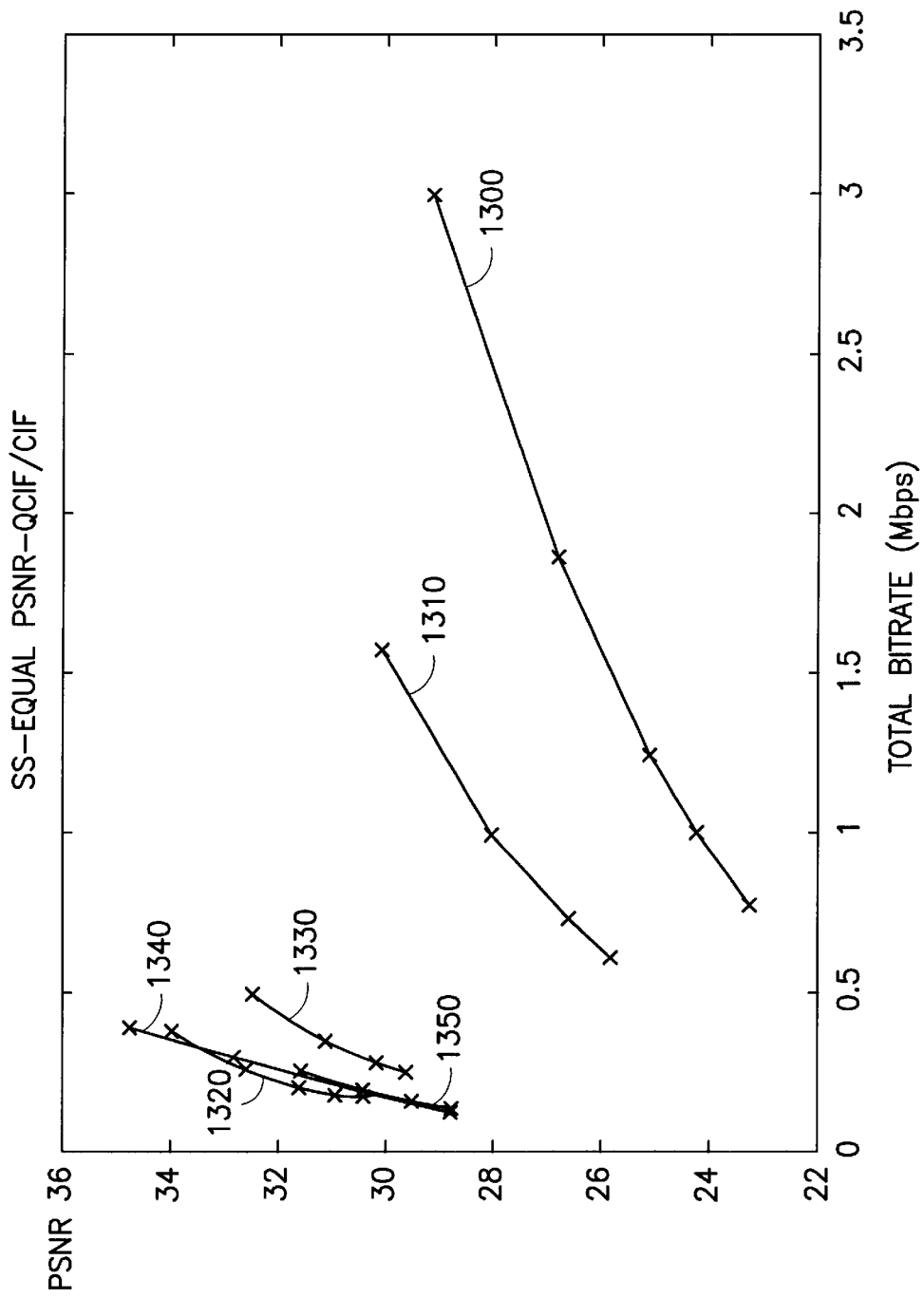
FIG. 13 is a plot of PSNR vs. total bit rate for QCIF/CIF spatial scalability, where the base layer and the enhancement layer for a given video sequence have the same PSNR for a given total bitrate.
Figure 14:
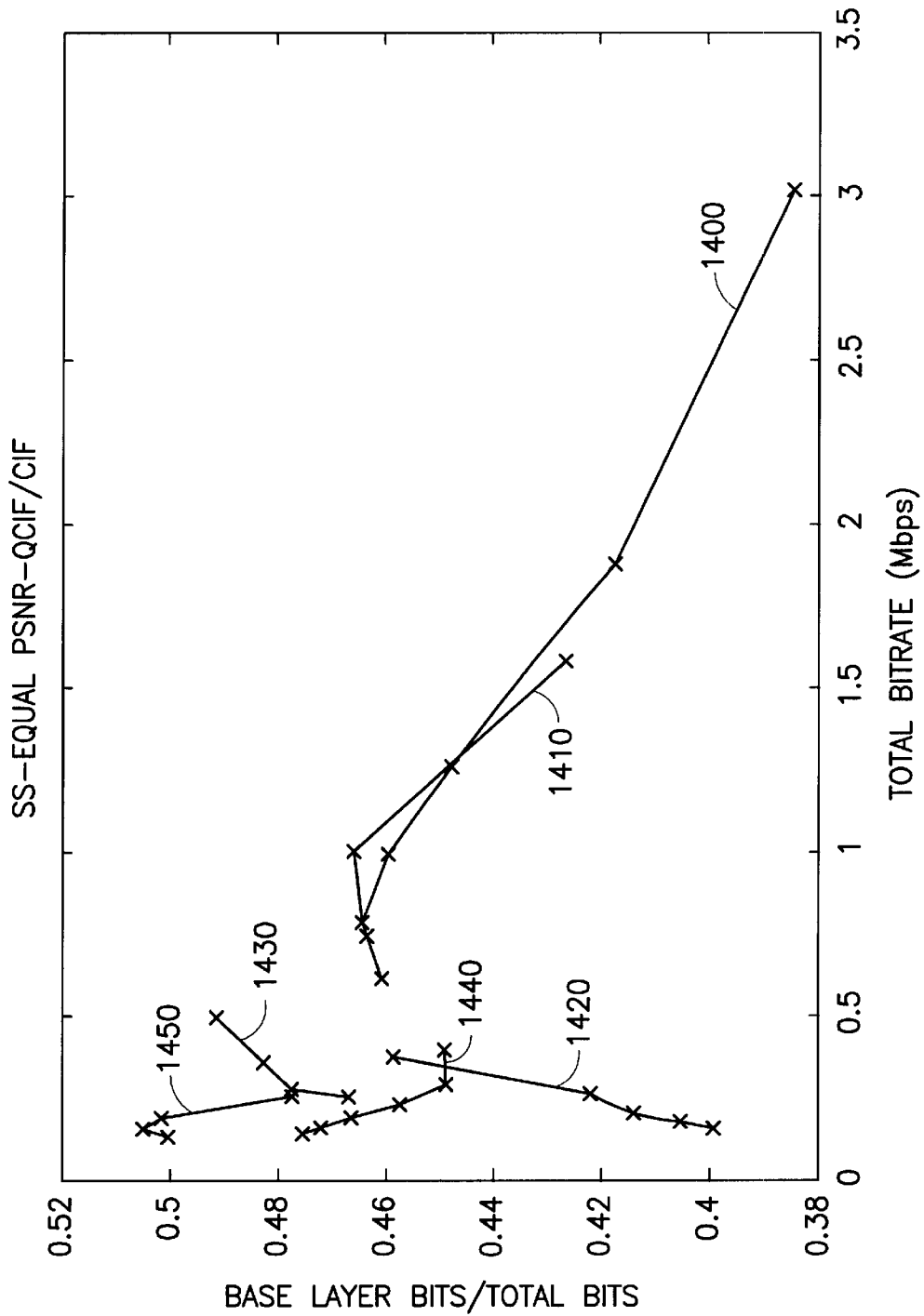
FIG. 14 is a plot of the fraction of total bits allocated to the base layer vs. total bit rate for QCIF/CIF spatial scalability, where the base layer and the enhancement layer of a given video sequence have the same PSNR for a given total bitrate.

FIGS. 13 and 14 show the results of performing the same analysis as described above for different sequences at a wide variety of constrained total bandwidths, where the base layer and enhancement layer have the same PSNR for a given total bit rate. In particular, FIG. 13 shows the PSNR versus total bitrate for the test sequences Basket 1300, Bus 1310, Carphone 1320, Foreman 1330, News 1340, and Silertvoice 1350. FIG. 14 shows the fraction of total bits allocated to the base layer versus total bitrate for the test sequences Basket 1400, Bus 1410, Carphone 1420, Foreman 1430, News 1440, and Silentvoice 1450. The data of FIG. 14 shows that approximately 45±5% of the total bandwidth should be allocated to the base layer to achieve equal quality in both layers of spatial scalable coded bitstreams. This percentage can be used as a general guide for the bit allocation of spatial scalable bitstreams.

FIGS. 15 through 20 show the simulcast and spatial scalability results for each test sequence, where the QCIF and CIF video sequences have the same PSNR for a given total bit rate.

Figure 15:
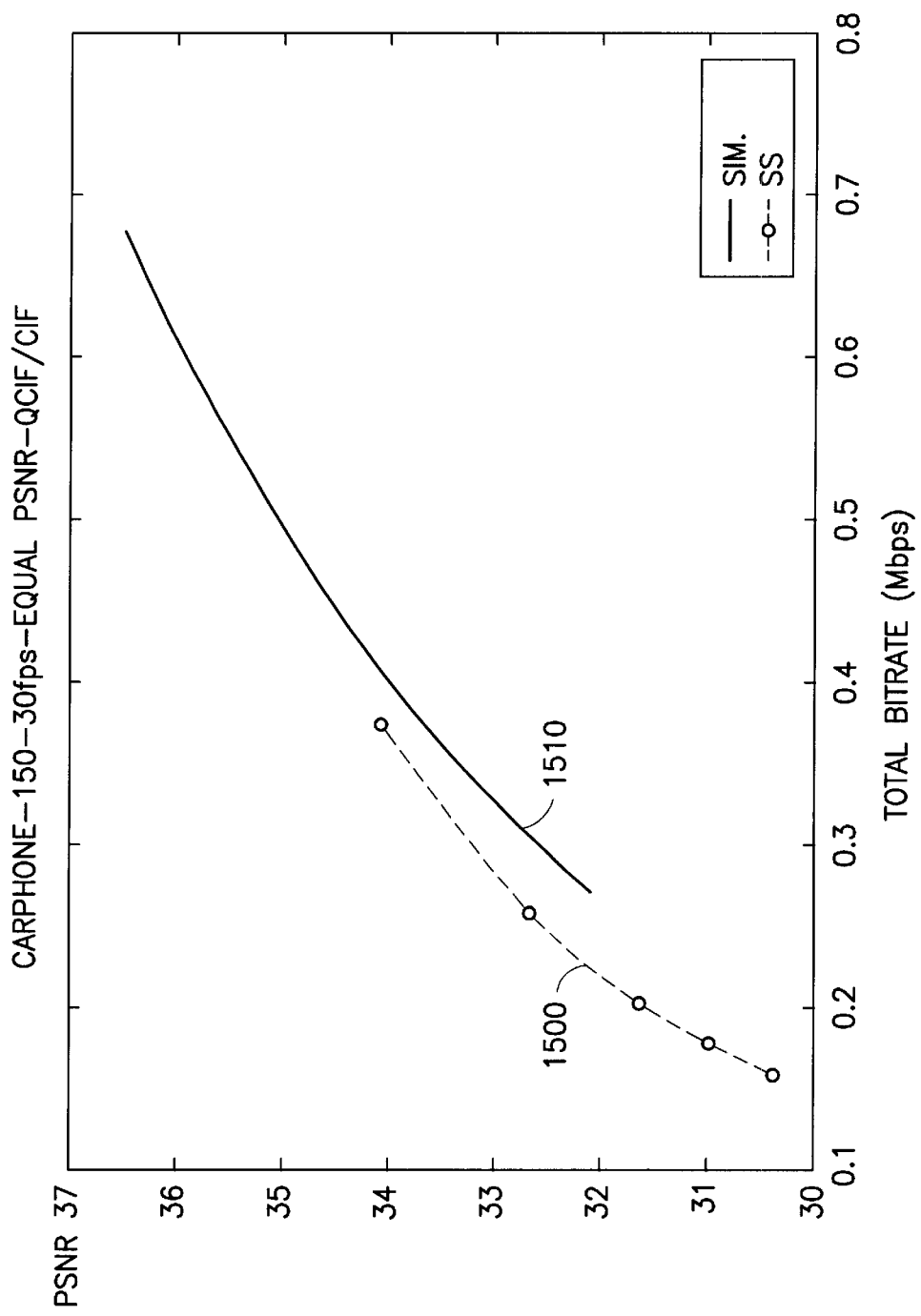
FIG. 15 is a plot of PSNR vs. total bit rate for QCIF/CIF simulcast and spatial scalable coding of the carphone video sequence, where the QCIF and CIF video sequences have the same PSNR for a given total bitrate.
Figure 16:
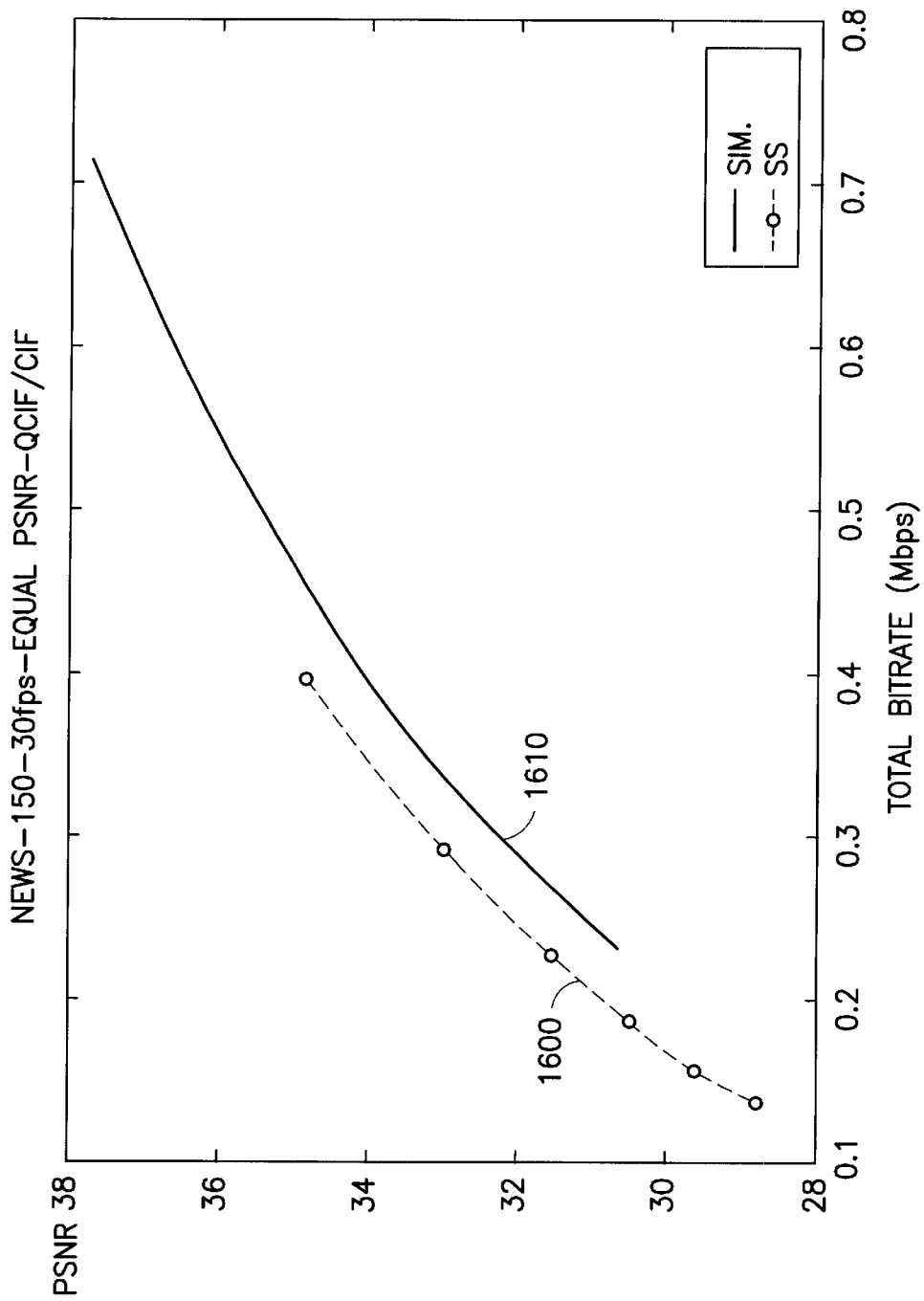
FIG. 16 is a plot of PSNR vs. total bit rate for QCIF/CIF simulcast and spatial scalable coding of the news video sequence, where the QCIF and CIF video sequences have the same PSNR for a given total bitrate.
Figure 17:
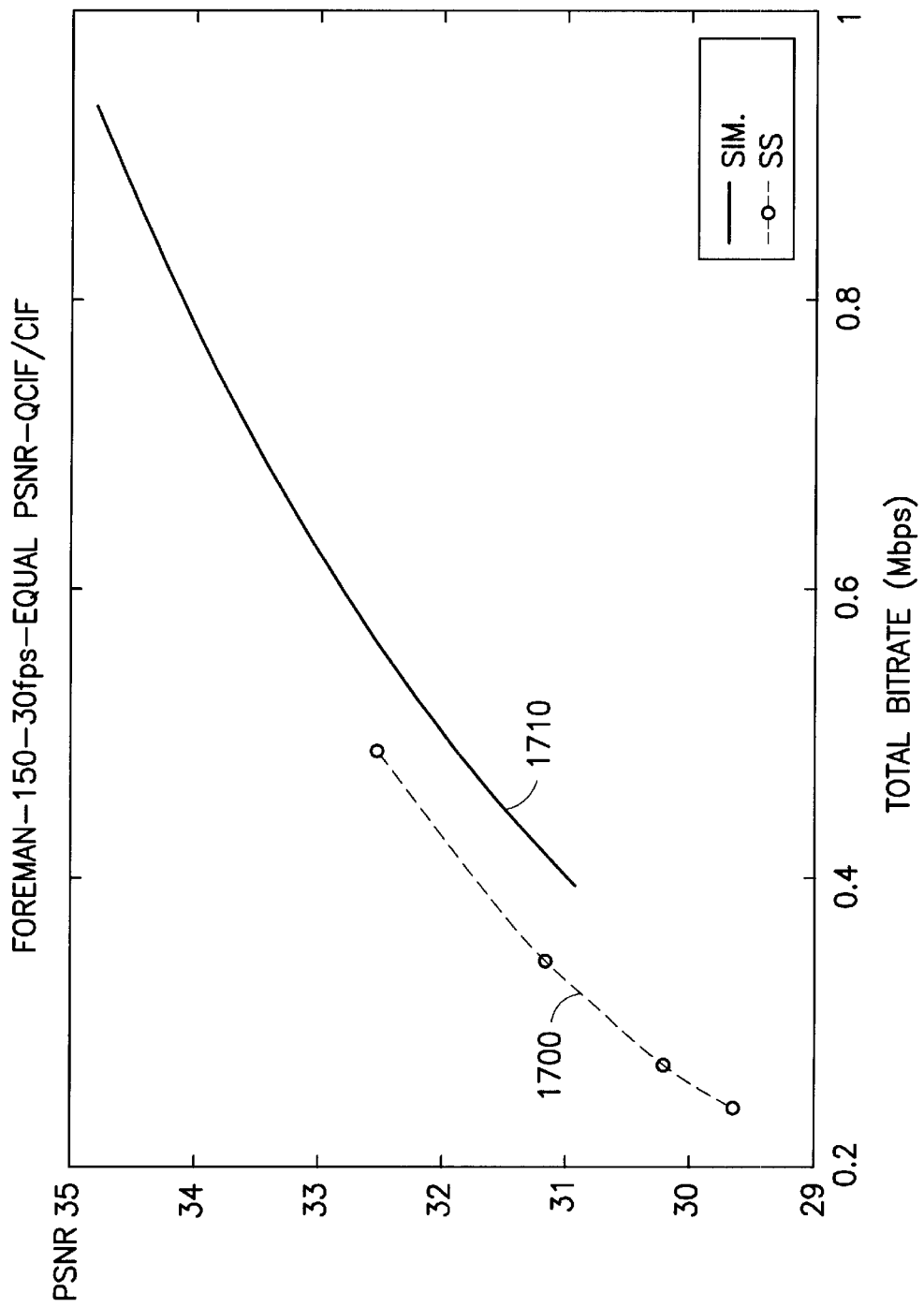
FIG. 17 is a plot of PSNR vs. total bit rate for QCIF/CIF simulcast and spatial scalable coding of the foreman video sequence, where the QCIF and CIF video sequences have the same PSNR for a given total bitrate.
Figure 18:
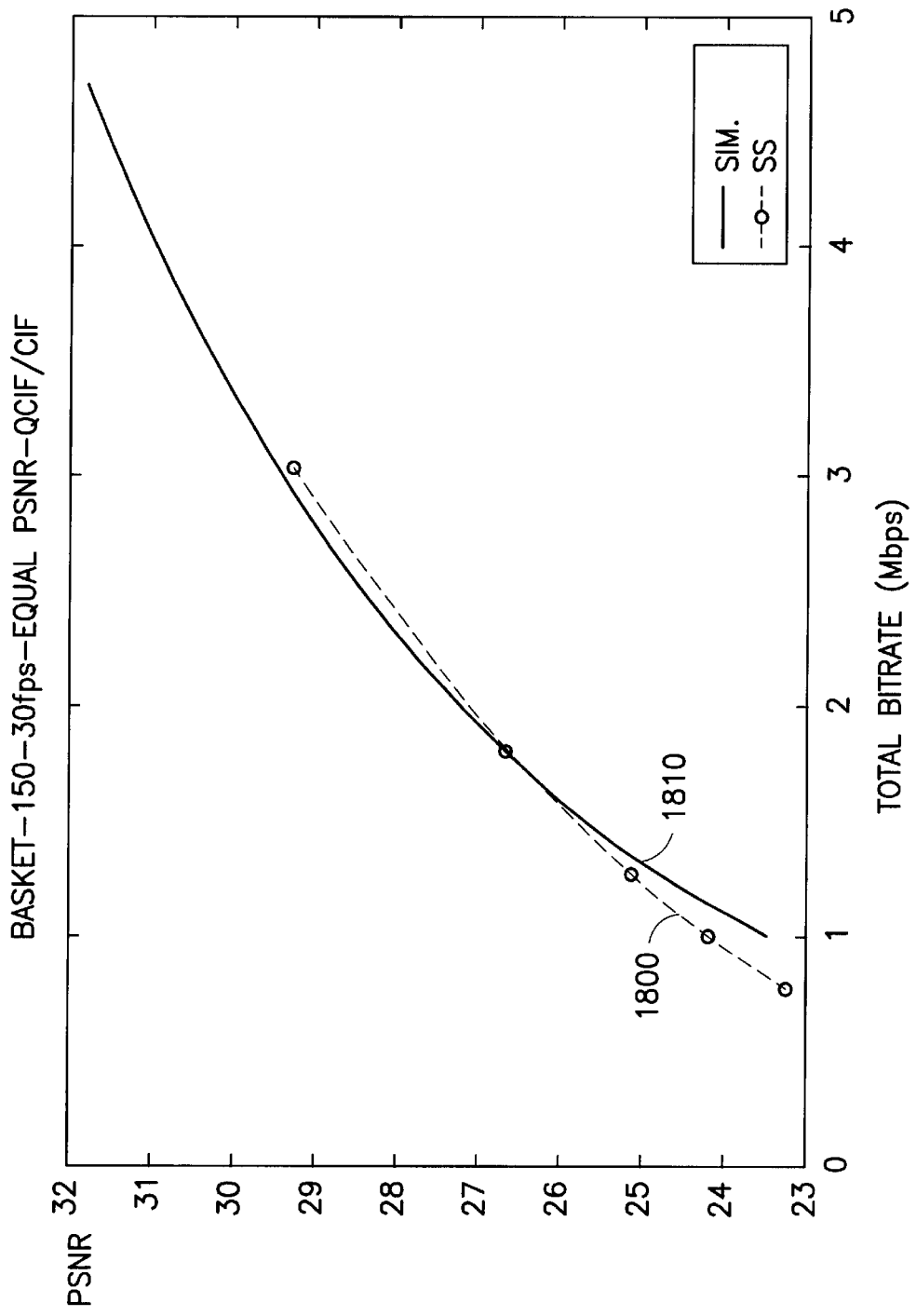
FIG. 18 is a plot of PSNR vs. total bit rate for QCIF/CIF simulcast and spatial scalable coding of the basket video sequence, where the QCIF and CIF video sequences have the same PSNR for a given total bitrate.
Figure 19:
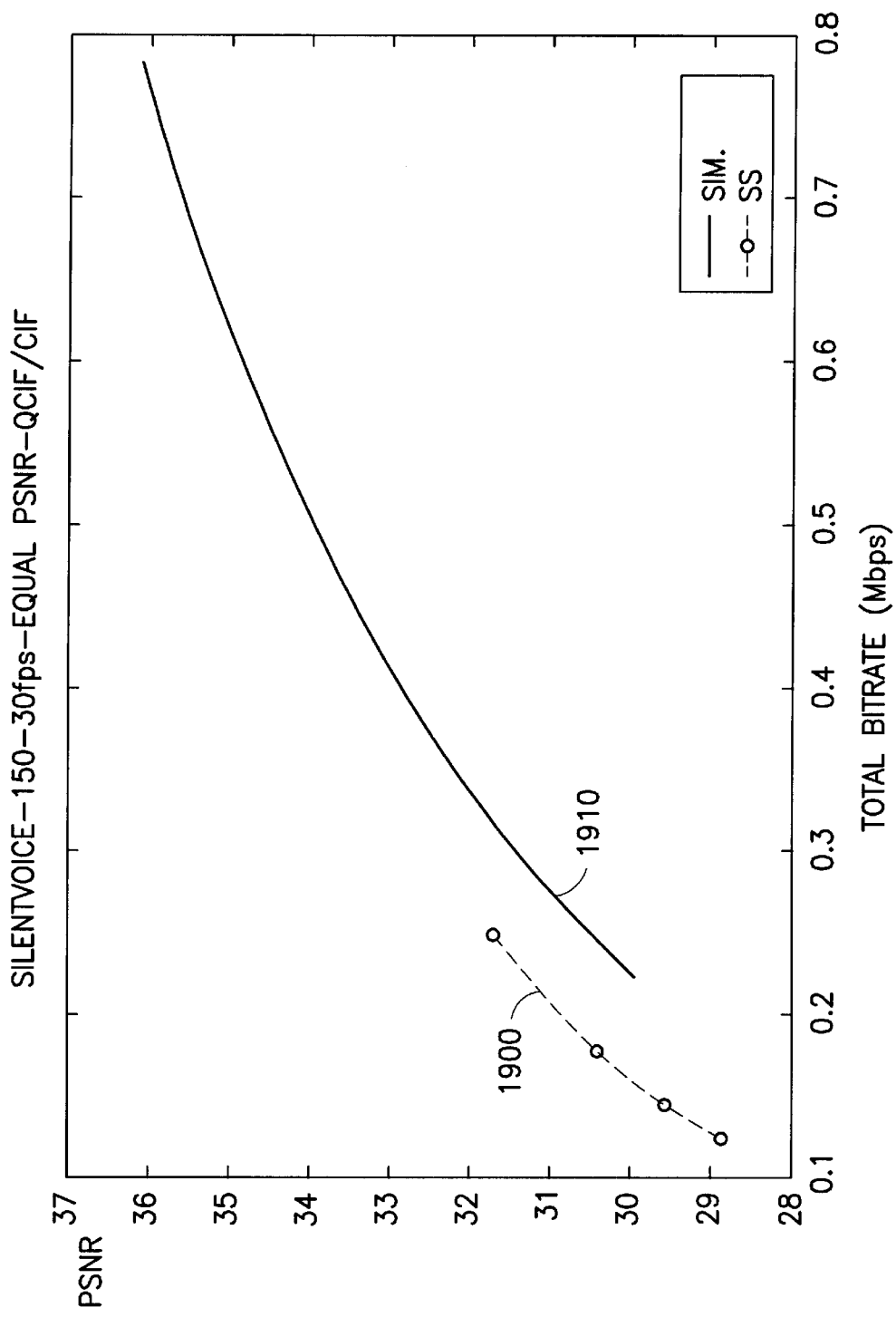
FIG. 19 is a plot of PSNR vs. total bit rate for QCIF/CIF simulcast and spatial scalable coding of the silentvoice video sequence, where the QCIF and CIF video sequences have the same PSNR for a given total bitrate.
Figure 20:
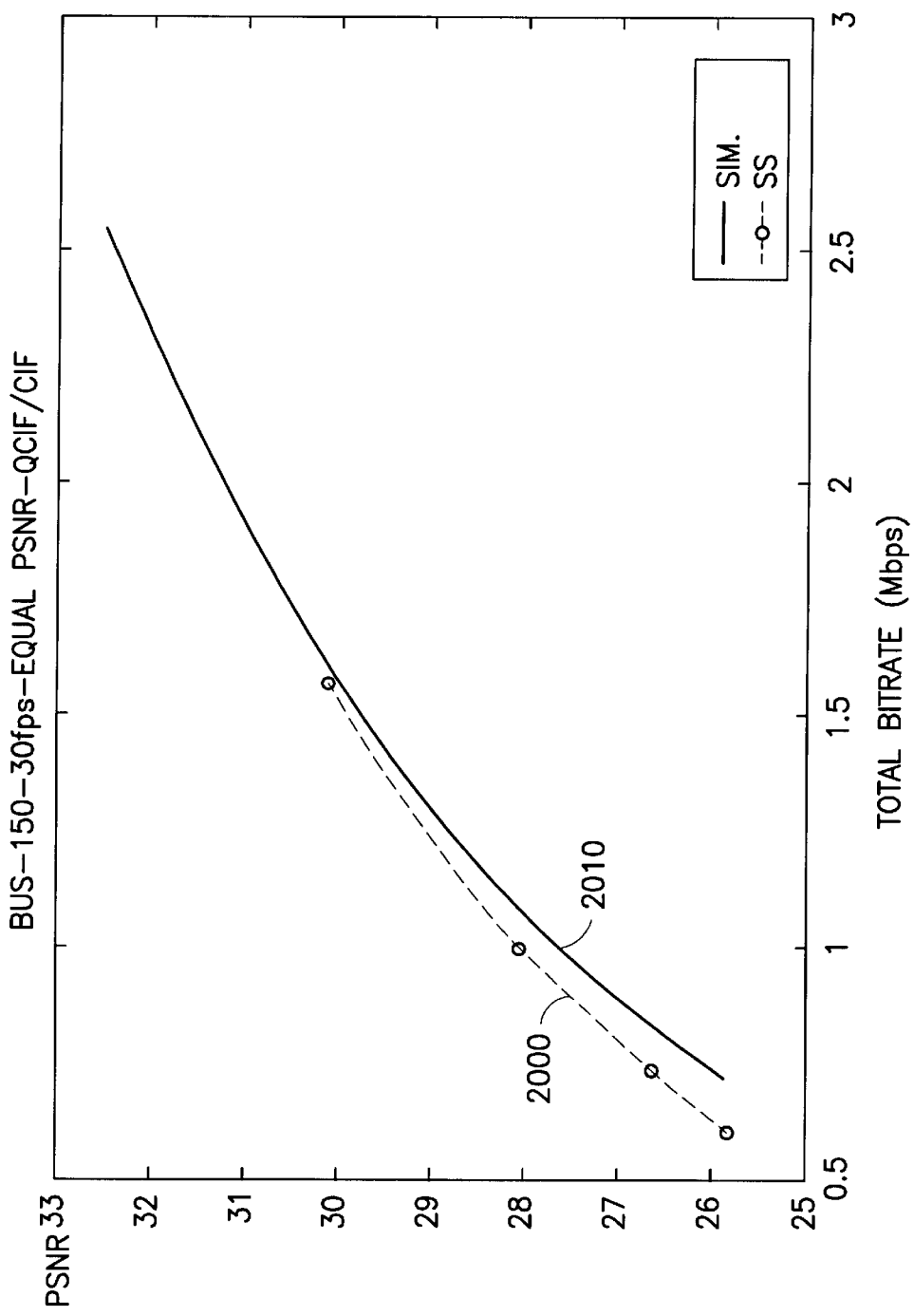
FIG. 20 is a plot of PSNR vs. total bit rate for QCIF/CIF simulcast and spatial scalable coding of the bus video sequence, where the QCIF and CIF video sequences have the same PSNR for a given total bitrate.

In particular, FIG. 15 shows the PSNR for spatial scalability 1500 and simulcast 1510 for the carphone sequence, FIG. 16 shows the PSNR for spatial scalability 1600 and simulcast 1610 for the news sequence, FIG. 17 shows the PSNR for spatial scalability 1700 and simulcast 1710 for the foreman sequence, FIG. 18 shows the PSNR for spatial scalability 1800 and simulcast 1810 for the basket sequence, FIG. 19 shows the PSNR for spatial scalability 1900 and simulcast 1910 for the silentvoice sequence, and FIG. 20 shows the PSNR for spatial scalability 2000 and simulcast 2010 for the bus sequence.

The operating regions of simulcast coding and spatial scalability are often different, with spatial scalability being the only option at relatively low total bit rates, and simulcast coding at relatively high total bit rates. Specifically, at relatively low bit rates, spatial scalability can be used if a coarse quantizer is used for residual coding. Simulcast coding may not be possible since the bandwidth may be too low to encode sequences at the higher resolution even with the coarsest quantizer. Note that much more information must be encoded for the simulcast case since no information is available from the base layer. That is, there usually is a lot less signal energy in the residual (the difference between the uncoded enhancement layer and an upsampled version of the decoded base layer) than in the original signal. The enhancement layer of spatial scalability can be thought of as encoding the residual while the second, higher-resolution stream of simulcast coding is encoding the original, high resolution signal. Since we are using the same range of quantizers for both the enhancement layer of spatial scalability and the second layer of simulcast coding, it is not surprising that there are different ranges for the coded bitrates for the two methods.

Except for some regions with the Basket sequence, there is an improvement in quality gained by using spatial scalability at bit rates where both simulcast coding and spatial scalability are possible. Table 3 lists the range of PSNR improvements for each sequence using spatial scalability where both simulcast and scalable coding are possible. The negative value for the minimum PSNR improvement for the Basket sequence indicates that simulcast coding achieves higher quality video for part of the common operating region.

Note that the decision between simulcast coding and spatial scalability for a commercial application generally involves more than looking at the differences in PSNR or other quality measure. The lower layer bit rate is smaller for simulcast coding, which favors simulcast coding since less bandwidth is required for reception of only the base layer. Additional decoder complexity is also required to decode spatial scalability bitstreams.

TABLE 3

Range of PSNR Improvements Using Spatial Scalability
Where Both Simulcast and Scalable Coding Are Possible

| Sequence | Maximum PSNR Improvement Using Spatial Scalability | Minimum PSNR Improvement Using Spatial Scalability |
| --- | --- | --- |
| Carphone | 0.74 | 0.41 |
| News | 1.06 | 0.79 |
| Foreman | 0.75 | 0.68 |
| Basket | 0.71 | −0.25 |
| Silentvoice | 1.27 | 1.18 |
| Bus | 0.65 | 0.11 |

The previous analysis focused on achieving equal PSNR in both layers. As discussed earlier this may not be the goal of some applications. A different view of this operating point reveals some additional insight into the general differences between simulcast coding and spatial scalability.

Figure 21:
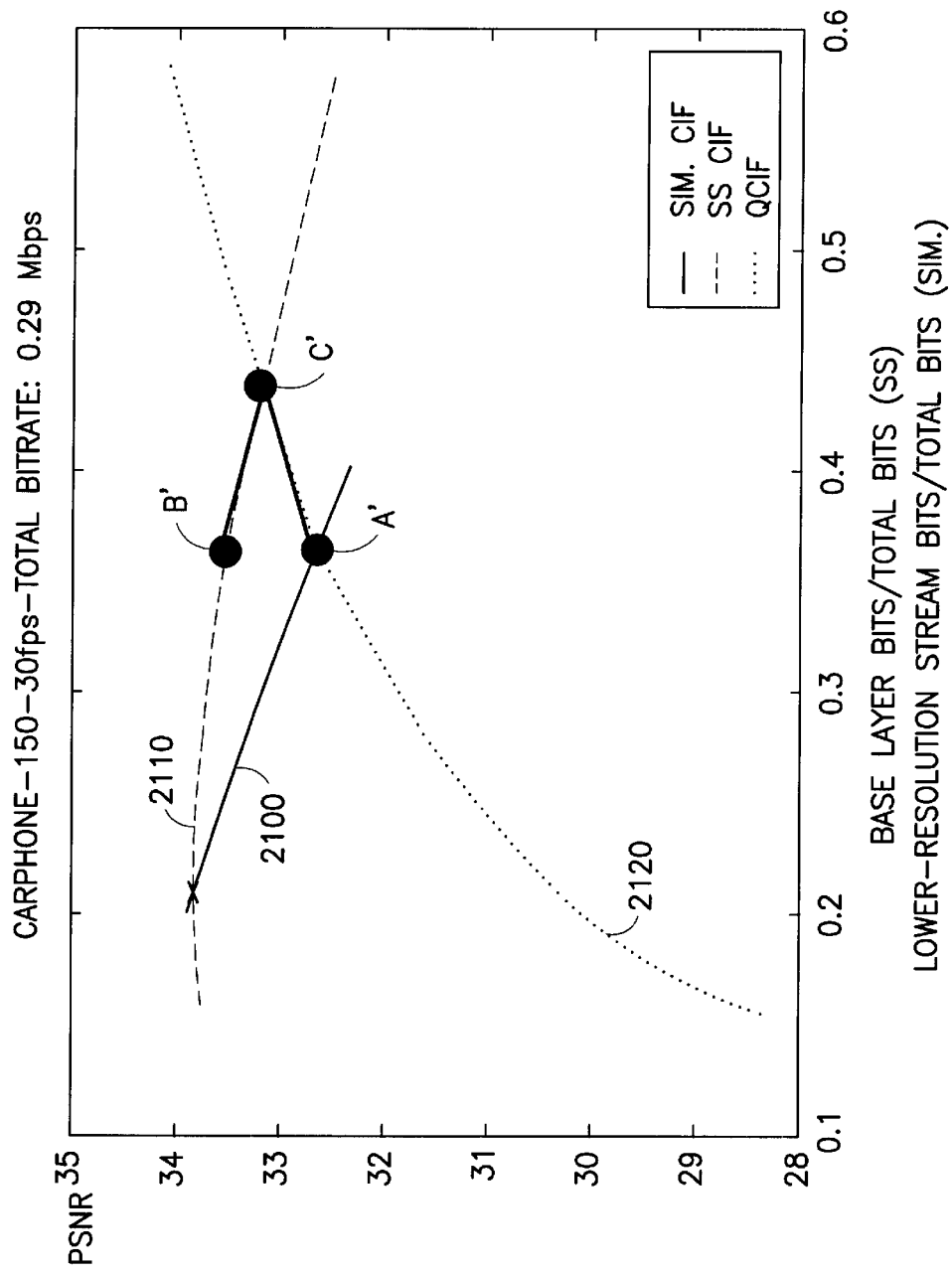
FIG. 21 is a plot of PSNR vs. the fraction of total bits allocated to the base layer (for SS) or to the lower-resolution stream (for Sim.), for the carphone video sequence and a total bandwidth of 0.29 Mbps, which also illustrates the tradeoff between base and enhancement layers (for SS), and between the lower and higher resolution streams (for Sim.)
Figure 22:
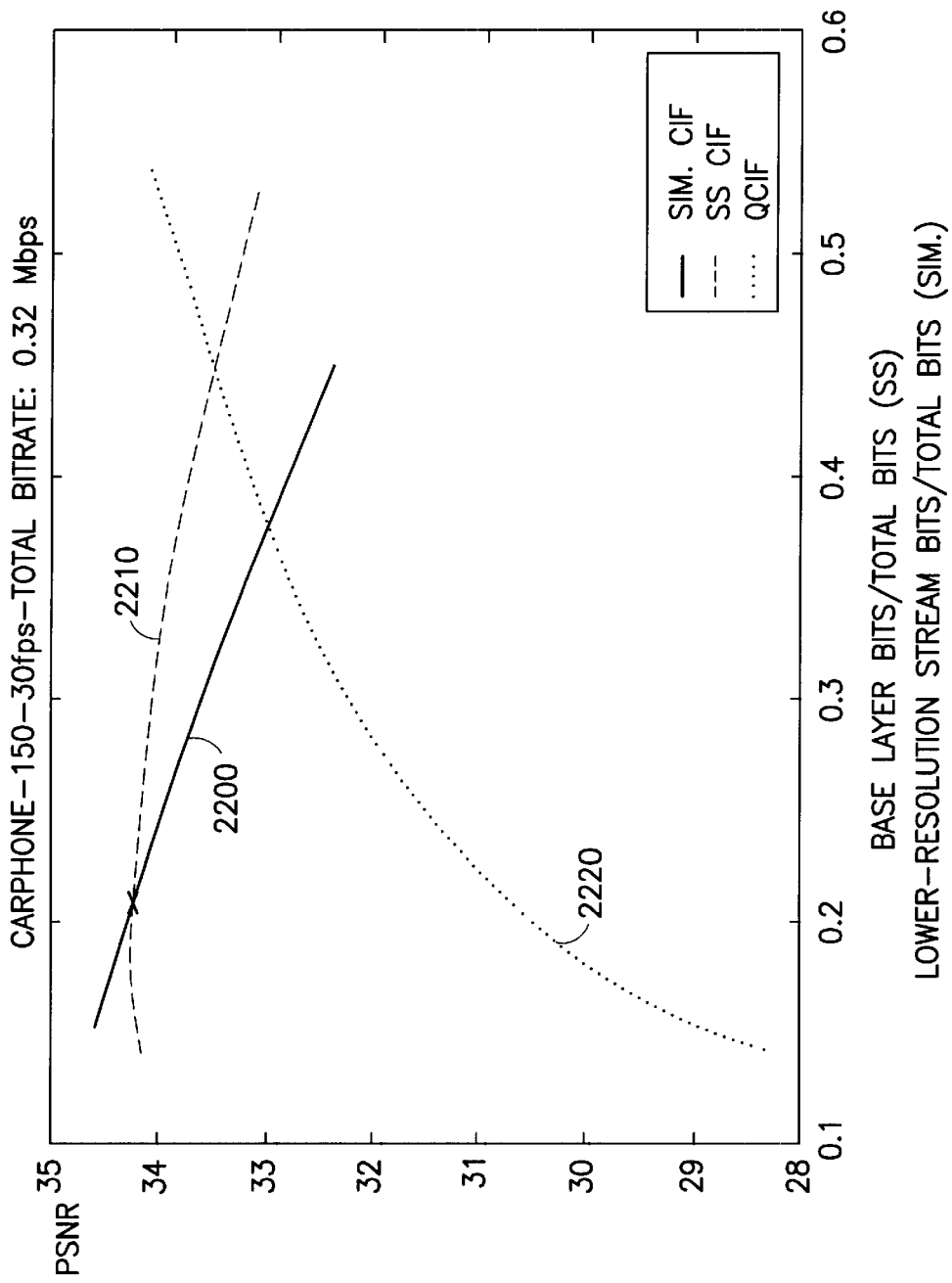
FIG. 22 is a plot of PSNR vs. the fraction of total bits allocated to the base layer (for SS) or to the lower-resolution stream (for Sim.), for the carphone video sequence and a total bandwidth of 0.32 Mbps.
Figure 23:
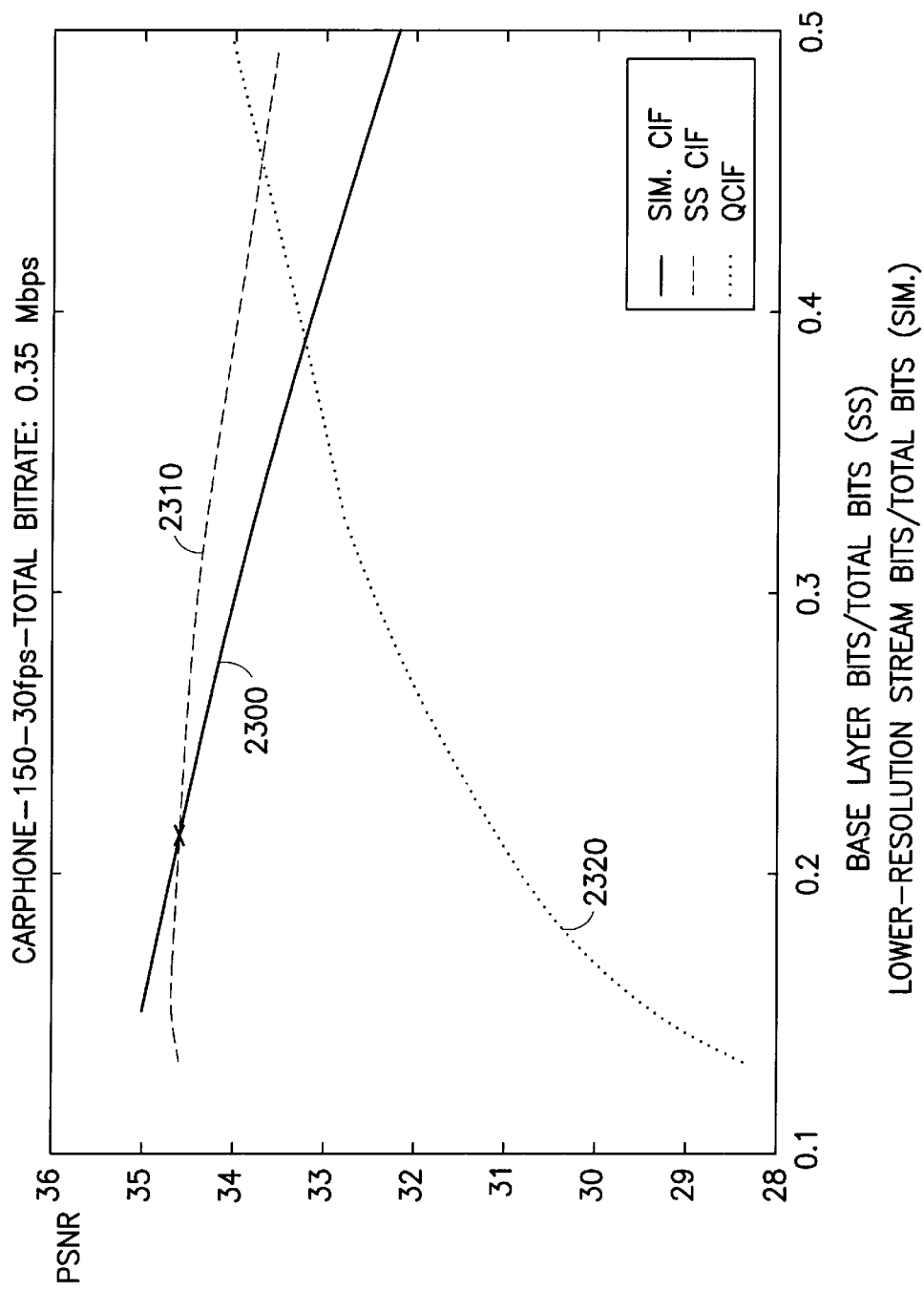
FIG. 23 is a plot of PSNR vs. the fraction of total bits allocated to the base layer (for SS) or to the lower-resolution stream (for Sim.), for the carphone video sequence and a total bandwidth of 0.35 Mbps.

FIGS. 21 through 23 show the results of both simulcast and scalable coding for the QCIF and CIF Carphone sequences with fixed total bandwidths of 0.29, 0.32 and 0.35 Mbps, respectively. The results are plotted as functions of the fraction of bits allocated to the base layer (for SS), or the lower-resolution stream (for Sim.).

In particular, FIG. 21 shows the PSNR for 0.29 Mbps for simulcast CIF 2100, spatial scalability CIF 2110, and QCIF 2120 (which is the same for simulcast or spatial scalability). FIG. 22 shows the PSNR for 0.32 Mbps for simulcast CIF 2200, spatial scalability CIF 2210, and QCIF 2220. FIG. 23 shows the PSNP for 0.35 Mbps for simulcast CIF 2300, spatial scalability CIF 2310, and QCIF 2320.

Note that simulcast ("Sim.") outperforms spatial scalability ("SS") if a relatively small percentage of the total bit rate is assigned to the base layer. One general trend appears to be the increasing advantage of spatial scalability with more bits allocated to the base layer.

As an example, FIG. 21 provide visual markers to aid the following discussion. Point A' is the operating point for equal PSNR in both streams using simulcast coding. Point B' is the corresponding point for spatial scalability using the same amount of bits allocated to the base layer as Point A'. Point C' is the operating point for equal PSNR in both layers using spatial scalability. Note that the use of the operating points that achieves equal quality in both streams or layers (Points A' and C', respectively) causes different amounts of bits to be allocated to the lower-resolution stream or base layer depending, respectively, on whether simulcast (Point A') or spatial scalability (Point C') is used.

Comparison of simulcast coding and spatial scalability with the same amount of bits allocated to the lower-resolution stream and base layer (Points A' and B', respectively) shows that spatial scalability results in a higher PSNR at the higher CIF resolution. Note that the PSNR at the lower QCIF resolution is the same for both simulcast coding and spatial scalability. Moreover, this is different from the gain in both the QCIF and CIF resolutions obtained by using the operating point for equal quality in both layers (Point C'). One way to interpret this concept is that part of the PSNR gain in the enhancement layer by using spatial scalable coding can be "exchanged" for an increase in the base layer by "moving" bits from the enhancement to the base layer. In fact, more bits can also be "moved" from the base layer to the enhancement layer. This concept can be visualized by simultaneously moving along the QCIF and CIF curves in FIG. 21. This allows different distributions, such as the points between Points B' and C' (for SS), or between Points A' and C' (for Sim.), to be achievable.

In general, the bit allocation problem involves two bit rates (the base and enhancement bitstreams for SS., and the lower-resolution and higher-resolution bitsreams for Sim.), and the choice between simulcast coding and spatial scalability. Note that more than two streams or layers may be used, in which case the bit allocation problem is extended accordingly.

One method to obtain this three-dimensional data (assuming two streams or layers) is to fix the rate of the base layer (or lower-resolution stream), and decide between simulcast coding and spatial scalability for different bit rates for the enhancement layer or higher-resolution stream. By combining the data at different base layer (lower-resolution stream) rates, the complete three-dimensional data can be constructed.

Figure 24:
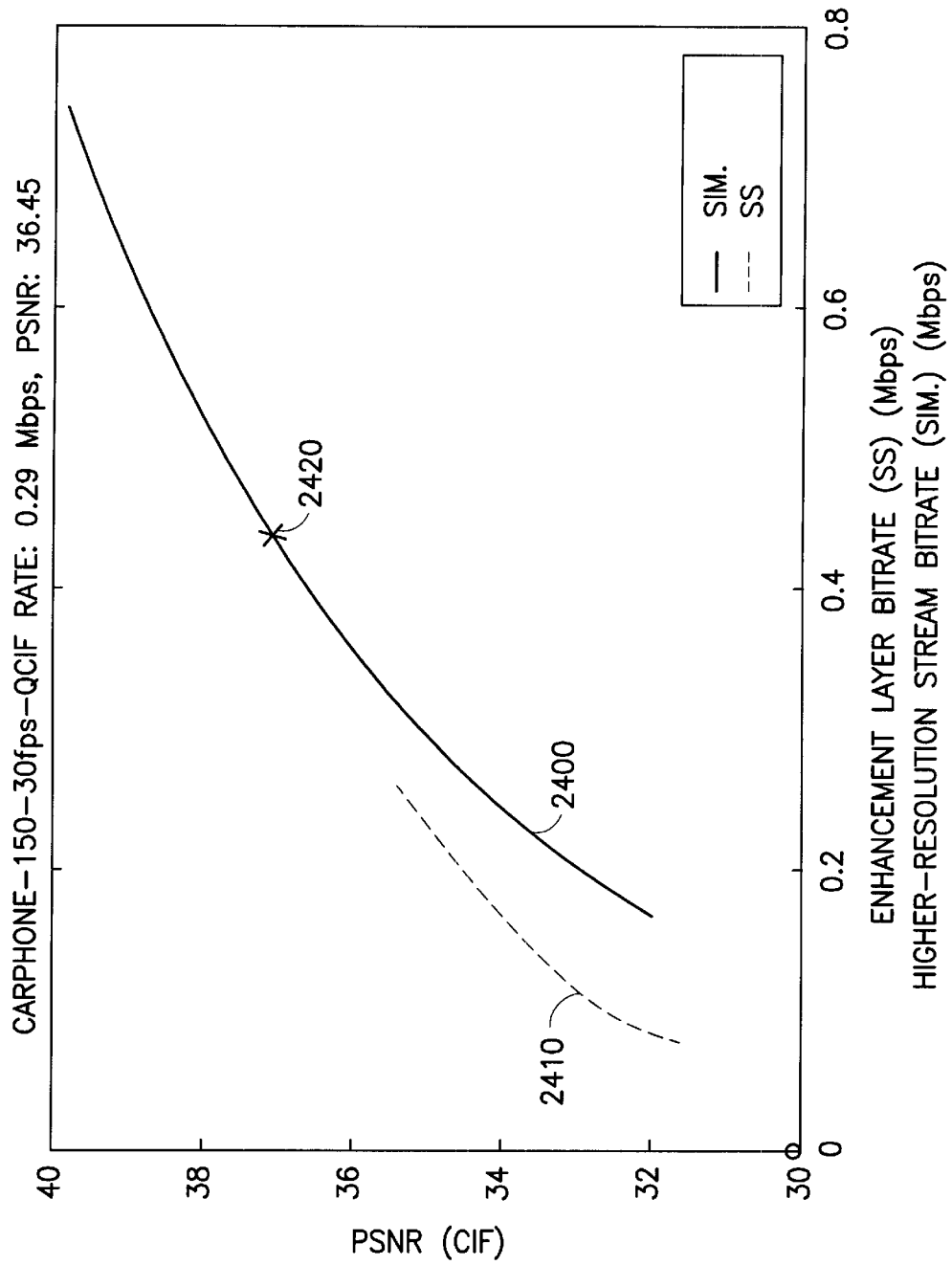
FIG. 24 is a plot of PSNR vs. the bit rate for the enhancement layer (for SS) or the higher-resolution stream (for Sim.) for the carphone video sequence and a fixed bit rate of 0.29 Mbps for the base layer (for SS) or the lower-resolution stream (for Sim.)
Figure 25:
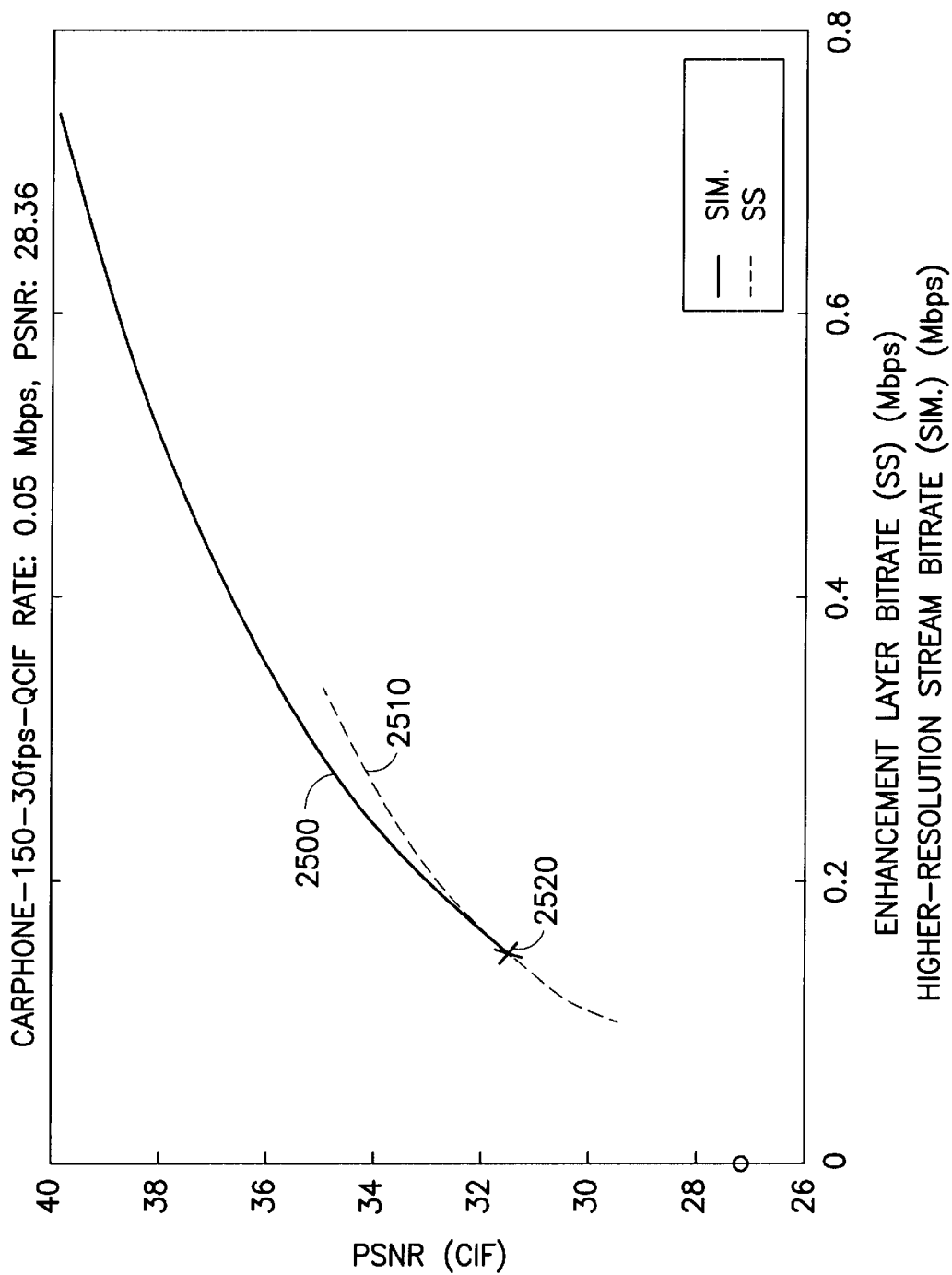
FIG. 25 is a plot of PSNR vs. the bit rate for the enhancement layer (for SS) or the higher-resolution stream (for Sim.), for the carphone video sequence and a fixed bit rate of 0.05 Mbps for the base layer (for SS) or the lower-resolution stream (for Sim.)

FIGS. 24 and 25 are examples of fixing the bit rate (and therefore, PSNR) of the base layer (or lower-resolution stream), for the transmission of the Carphone QCIF and CIF sequences. In particular, FIG. 24 shows the PSNR of the higher-resolution stream or enhancement layer, respectively, for simulcast 2400 and spatial scalability 2410 at 0.29 Mbps, and FIG. 25 shows the corresponding PSNR for simulcast 2500 and spatial scalability 2510 at 0.05 Mbps. Note that the curve for spatial scalability has a smaller dynamic range.

In FIG. 24, fixing the QCIF data results in a PSNR of 36.45 for that data. The total bit rate is then 0.29 Mbps+the enhancement layer or higher-resolution stream layer bit rate. The data point at (0 Mbps, 30 dB) results if no enhancement layer data is used, i.e., the base layer is simply upsampled (using bilinear interpolation) to create the enhancement layer. In FIG. 25, the fixed QCIF bit rate results in a PSNR of 28.36 for that data. The total bit rate is then 0.05 Mbps+the enhancement layer or higher-resolution stream bit rate. The data point at (0 Mbps, 27 dB) results if no enhancement layer data is used, i.e., the base layer is simply upsampled (using bilinear interpolation) to create the enhancement layer. The general trend is for spatial scalability to be more efficient at lower enhancement layer/higher-resolution stream bit rates, while simulcast coding is more efficient at higher enhancement layer/higher-resolution stream bit rates. An important result is to determine the boundary where simulcast coding and spatial scalability are equivalent. This boundary can then be used to determine whether one should use simulcast coding or spatial scalability.

The functions for simulcast coding and spatial scalability may not intersect, but the curves can be extrapolated to find an intersection point by fitting both curves to logarithms and finding the intersection of the logarithmic fits. In particular, assume the two logarithmic functions are:

$$Y_1 = A\ln(X) + B$$
$$Y_2 = C\ln(X) + D$$

Y1 is the PSNR for one curve, e.g., the simulcast coding curve, with curve fit constants A and B. Y2 is the PSNR for the other curve, e.g., the spatial scalability curve, with curve fit constants C and D. Solving for the point of intersection between the two logarithmic functions yields:

$$Y_1 = Y_2$$
$$A\ln(X) + B = C\ln(X) + D$$
$$(A - C)\ln(X) = D - B$$
$$\ln(X) = \frac{D - B}{A - C}$$
$$X = e^{\frac{D-B}{A-C}}$$

The crosses in the figures (point 2420 in FIG. 24, and point 2520 in FIG. 26) represent the estimated points of intersection.

Figure 26:
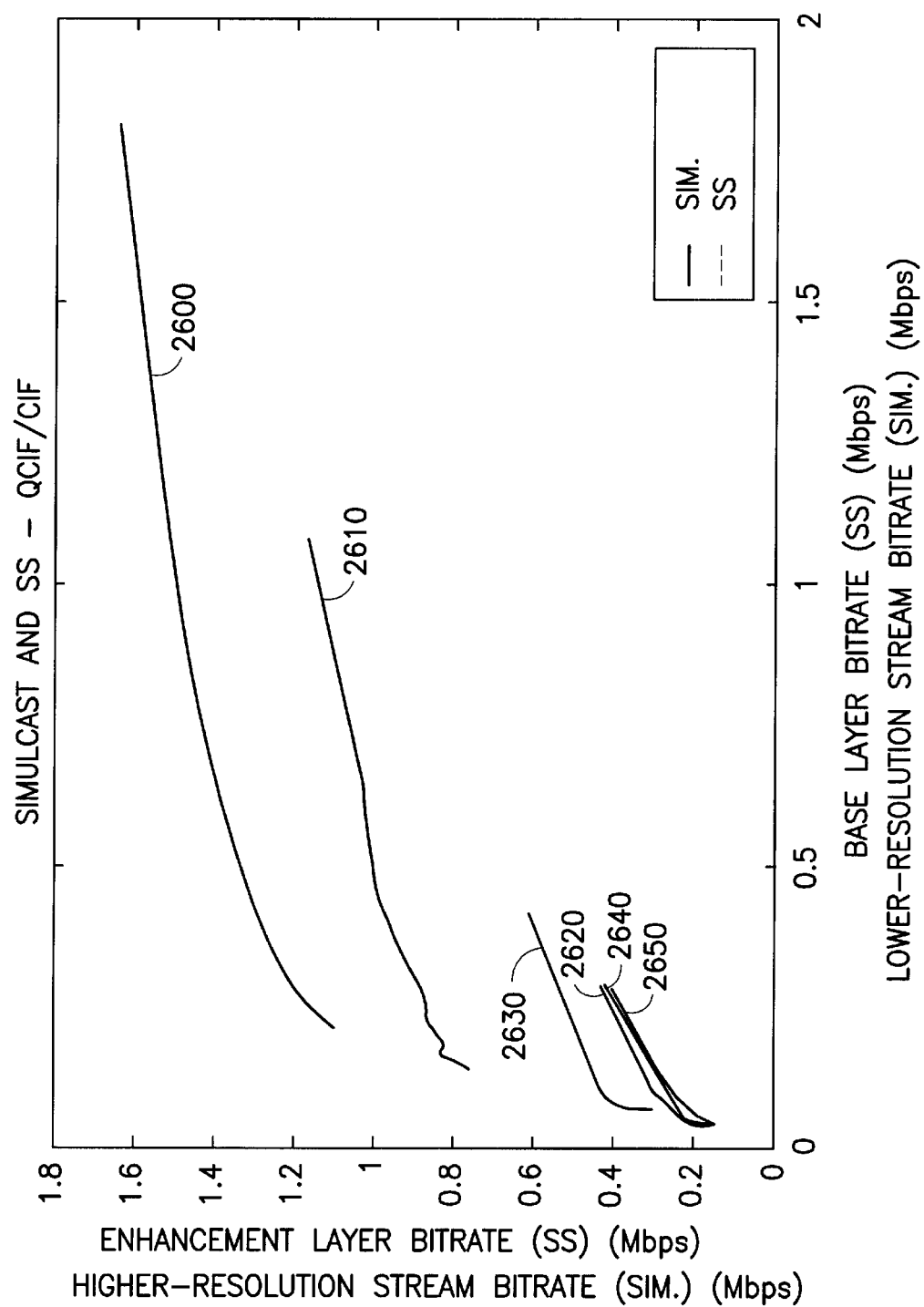
FIG. 26 is a plot of the bit rate for the enhancement layer (for SS) or the higher-resolution stream (for Sim.) vs. the bit rate for the base layer (for SS) or the lower-resolution stream (for Sim.), for simulcast and spatial scalability decision boundaries.

FIG. 26 shows the results of applying this technique of estimating the boundary between simulcast coding and spatial scalability for all the test sequences. This figure shows the test sequences Basket 2600, Bus 2610, Carphone 2620, Foreman 2630, News 2640, and Silentvoice 2650. For each video sequence, the data indicates that operating points above the curve should use simulcast coding and points below the curve should use spatial scalability to obtain the highest PSNR for the CIF video sequence (e.g., the enhancement layer or higher-resolution stream). Note that specifying the base bit rate uniquely determines the PSNR of the QCIF sequence since this resolution is single layer coded. The decision boundaries tend to have the same shape with different scales.

Figure 27:
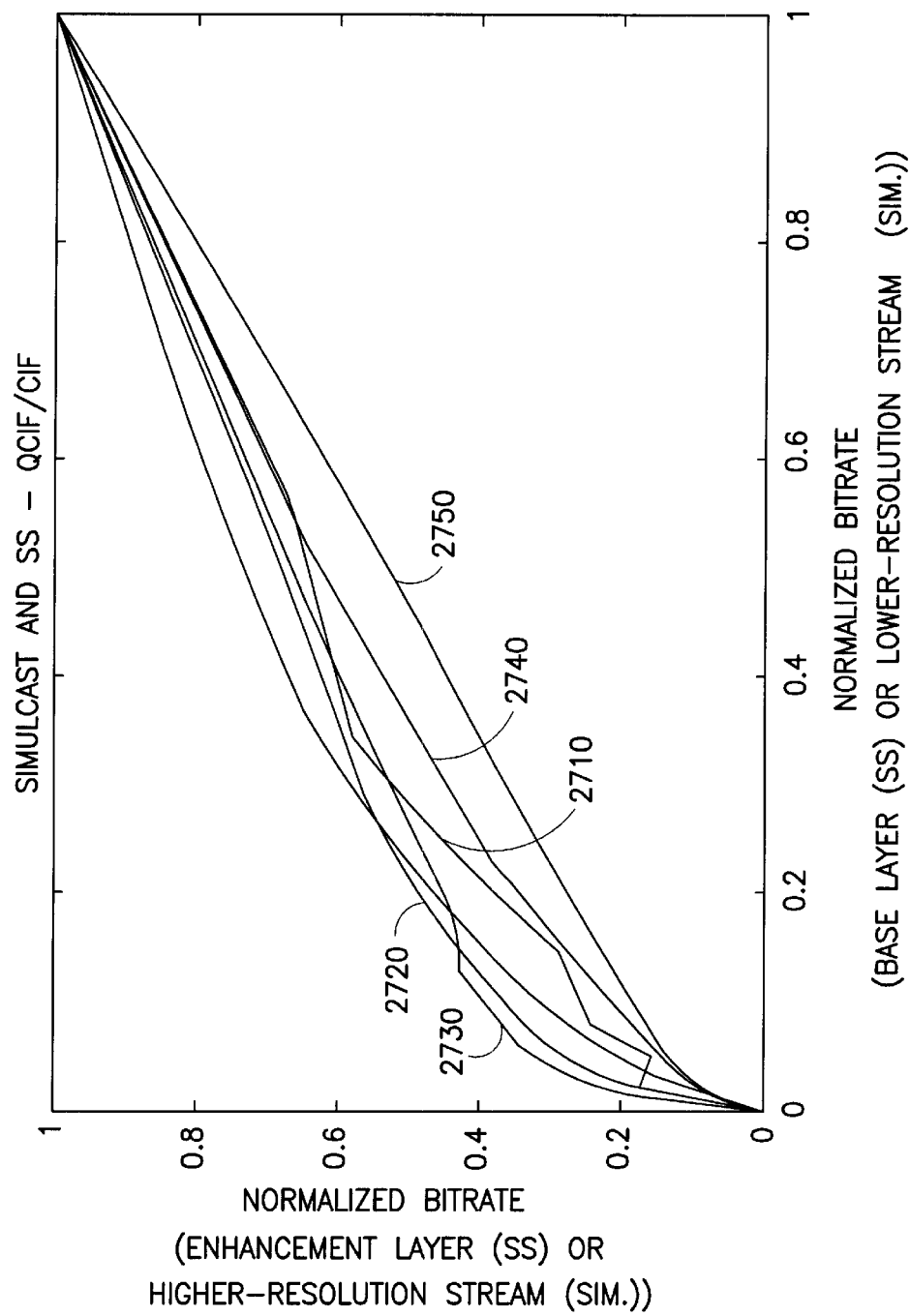
FIG. 27 is a plot of normalized bit rate for the enhancement layer (for SS) or the higher-resolution stream (for Sim.) vs. normalized bit rate for the base layer (for SS) or the lower-resolution stream (for Sim.), for simulcast and spatial scalability decision boundaries.

FIG. 27 demonstrates the similarity of the decision boundaries this by normalizing the base layer and the enhancement layer bit rates (for SS), and by normalizing the lower-resolution stream and higher-resolution stream bit rates (for Sim.), using the range of the data and the following formula:

$$\text{Normalized Bitrate} = \frac{\text{Bitrate} - \text{Minimum}}{\text{Maximum} - \text{Minimum}}.$$

This formula maps the minimum absolute bit rate to a zero normalized bit rate and the maximum absolute bit rate to a normalized bit rate of one.

FIG. 27 shows normalized decision boundaries for the test sequences Basket 2700, Bus 2710, Carphone 2720, Foreman 2730, News 2740, and Silentvoice 2750.

The results above allow one to choose between simulcast and spatial scalability strictly on the basis of which mode provides higher quality. Considering other issues such as the additional receiver complexity required for spatial scalability may require not only determining which mode is better, but how much improvement is obtained, especially when factors support the other mode. This requires looking at the three-dimensional data. Note that determining which mode is better regardless of the PSNR difference is equivalent to a projection of the three-dimensional data onto a two-dimensional space. Visualizing and establishing decision criteria for surfaces is difficult for general scenarios and may be best handled in a case-by-case manner.

Multicast Environment

The present invention can be applied to video broadcasting in a multicast environment, such as a video server providing video (e.g., movies) to users via a computer network such as the Internet. The users may receive the data via an appliance such as a personal computer, Internet-capable set-top box, or the like. In this environment, multiple clients require different types of service due to variations in their processing power, memory resources and available bandwidth. The server would like to provide different resolutions and/or qualities of the same video sequence to satisfy each type of client. Note that the server should provide content for all the service rates continuously, otherwise, an entire client type does not receive service.

This scenario is different from the unicast environment, where different levels of service are provided to account for dynamic changes in the point-to-point transmission. In this case, the server can adaptively switch between bitstreams to provide service commensurate with the available resources. Therefore, only one bitstream is transmitted at any instance and it can be tailored to the target bit rate. This scheme provides high quality video, and benefits from low decoder complexity since single-layer decoding is always used.

Different services may involve improving the spatial resolution, temporal resolution and/or quality of the video transmission with increasing bit rates. This discussion focuses on providing different levels of spatial resolution. Consider the following example with two levels of service. Clients at the lower service rate receive QCIF resolution video and those at the higher service rate receive CIF resolution video. Both service rates receive video with the same temporal resolution.

One approach to providing multicast service is to simulcast code the sequence at all of the service rates. This approach produces high quality video at all service rates. However, since service must be provided to all client types, the encoder must transmit a large amount of data, i.e., the sum of all the service rates. The main expense in multicast transmission is the total used bandwidth (in terms of total number of packets transmitted). Network congestion is also a problem, so it may be necessary to constrain the total combined rate of all the service rates. The minimum bandwidth necessary is the largest single service rate that is able to provide adequate service to all clients. The following discussion assumes that a constraint on the total bandwidth is imposed where the constrained rate is between the largest single service rate and the sum of all the service rates.

The simulcast approach can still be used to provide two levels of service by reducing the higher bitstream to the difference between the constrained total and the lower bitstream. Another approach is to use spatially scalability. Intuitively, one expects spatial scalability to perform better since the information in the base layer (QCIF) sequence is used to assist construction of the enhancement layer (CIF) sequence. In general, this is true, but it has been found in connection with the present invention that simulcast coding can outperform spatial scalability when a small proportion of bits are allocated to the base layer/lower-resolution stream. This is counterintuitive, since spatial scalability "reuses" information in the base layer and its enhancement layer has the same bit rate as the single layer bitstream used by simulcast coding. One explanation may be that the overhead incurred by using a scalable coding syntax surpasses the gain obtained. The base layer also may not provide good prediction when a small amount of bits is allocated to it.

Figure 28:
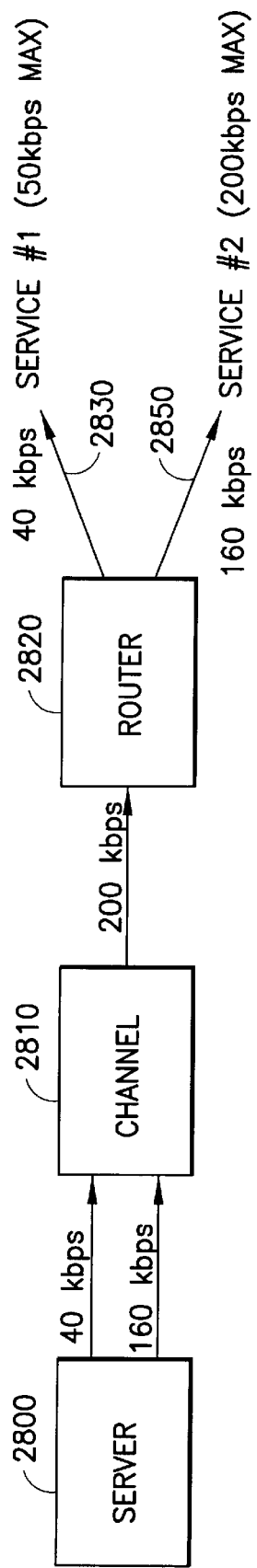
FIG. 28 is a block diagram illustrating an example of multicast broadcasting using simulcast coding.
Figure 29:
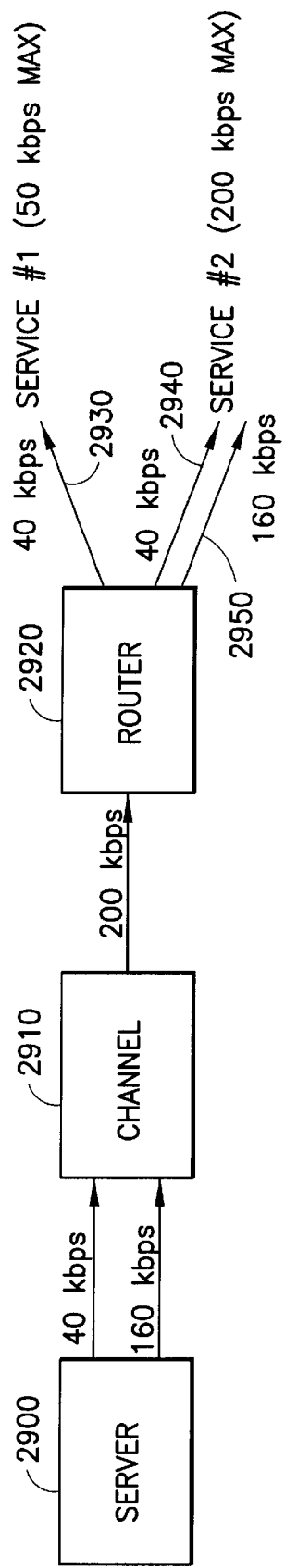
FIG. 29 is a block diagram illustrating an example of multicast broadcasting using spatial scalability coding.

FIGS. 28 and 29 are examples of multicast broadcasting using simulcast coding and spatial scalability, respectively, when the total used bandwidth is constrained to 200 kbps and the user service rates are 50 kbps and 200 kbps.

In FIG. 28, a server 2800 provides simulcast-coded lower-resolution and higher-resolution streams at 40 and 160 kbps, respectively, to a 200 kbps channel 2810 and a switching device, such as a router 2820. The 40 kbps stream is routed to the first service via a path 2830, and the 160 kbps stream is routed to the second service via a path 2850. The router 2820 does not route the 160 kbps stream to the first service since the first service cannot handle this data rate. Moreover, the router 2820 does not route the 40 kbps stream to the second service since this service only has use for one of the streams, and can handle the higher resolution 160 kbps stream.

Any known computer-network routing protocol may be used to achieve this result. In particular, the router 2820 should be informed of which services can handle which data rates. Each service can represent many end users.

In FIG. 29, a server 2900 provides spatial scalability-coded base and enhancement layers at 40 and 160 kbps, respectively, to a 200 kbps channel 2910 and a switching device, such as a router 2920. The 40 kbps base layer is routed to the first service via a path 2930, and both the 40 kbps base layer and 160 kbps enhancement layer are routed to the second service via paths 2940 and 2950, respectively (which may be the same path). The second service receives both the layers since they must be used together to obtain the maximum information (e.g., image resolution).

Note that the video for the 50 kbps service rate is identical regardless of which coding approach is used. That is, the user with the 50 kbps service receives only the 40 kbps lower-resolution stream when simulcast coding is used, or the equivalent 40 kbps base layer when scalability coding is used.

The 200 kbps service in the simulcast coding approach (FIG. 28) constructs video for the higher service rate using the 160 kbps stream. This service does not use the 40 kbps single layer stream since it is independent from the 160 kbps layer and therefore there is no benefit to using it.

However, the 200 kbps service in the spatial scalability approach (FIG. 29) can use the 40 kbps base layer in addition to the 160 kbps enhancement layer, allowing it to construct video for the higher service rate using 200 kbps. These figures support the intuition that spatial scalability can outperform simulcast coding.

As discussed, FIG. 22 shows the results of encoding the QCIF and CIF Carphone sequences using both spatial scalability and simulcast coding with different bit allocations, but a fixed total bandwidth of 0.32 Mbps. Note that spatial scalability outperforms simulcast coding for many different bit allocations. However, simulcast coding is more efficient if less than about 20% of the total bandwidth is allocated to the base layer/lower-resolution stream.

Figure 30:
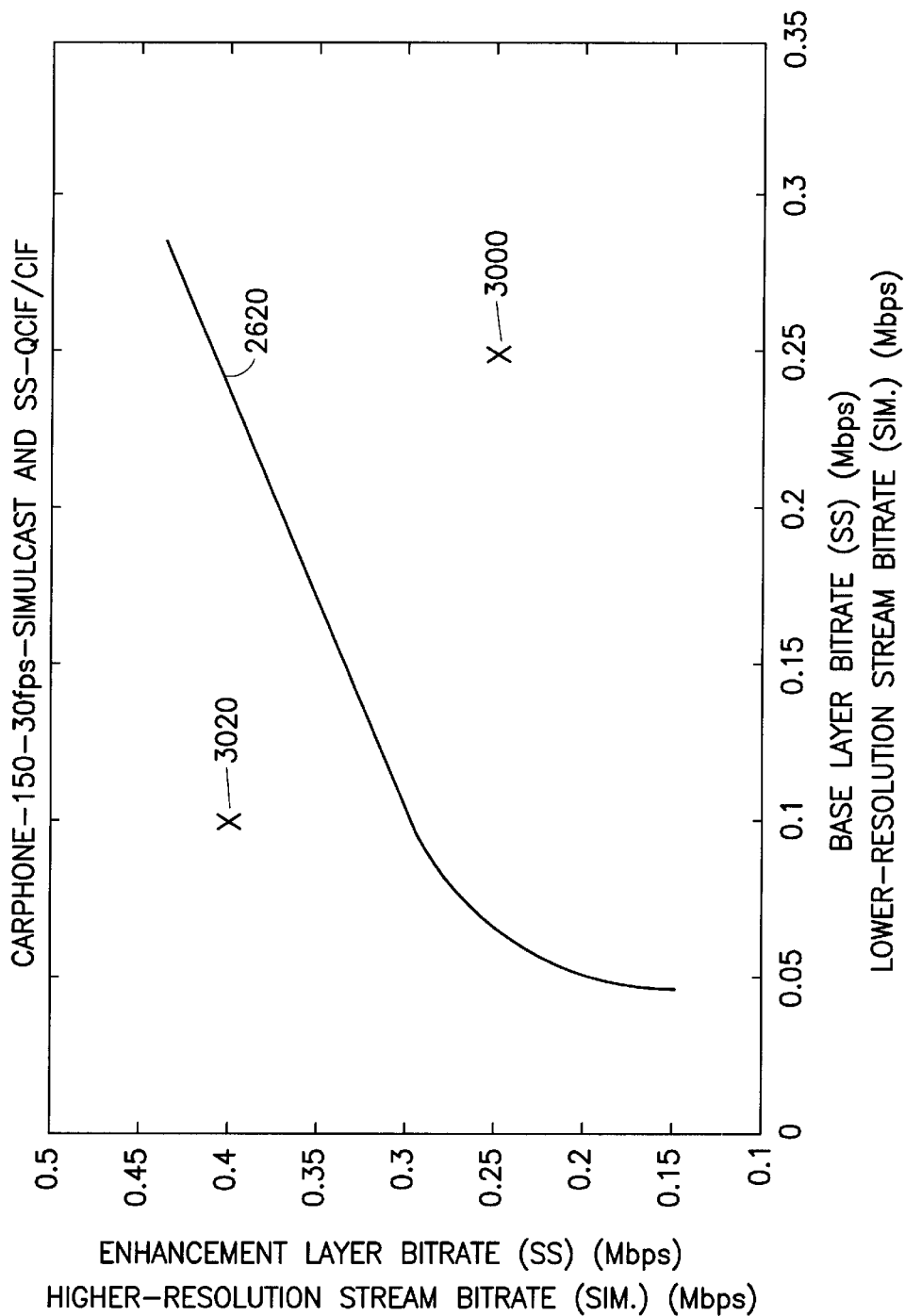
FIG. 30 is a plot of bit rate for the enhancement layer (for SS) or the higher-resolution stream (for Sim.) vs. bit rate for the base layer (for SS) or the lower-resolution stream (for Sim.), for simulcast and spatial scalability decision regions.

FIG. 30 shows a decision boundary 2620 (from FIG. 26) between simulcast coding and spatial scalability for the Carphone QCIF and CIF sequences. In accordance with the invention, operating points above the decision boundary should use simulcast coding, and points below it should use spatial scalability coding. The definition of operating point used here is the average bitrate over the entire sequence. Note that similar analysis can be performed using a smaller subset of the sequence such as a group of pictures. The methods described in this document can be used to construct this curve and then used to determine whether simulcast coding or spatial scalability should be used to encode the video.

A fixed total bitrate gives only one constraint on two variables (the base and enhancement bit rates), therefore, one can use any distribution of the total bitrate. For example, assume that 0.5 Mbps total bitrate is available. In one case, 0.25 Mbps is used for the QCIF resolution, and 0.25 Mbps is used for the CIF resolution. Since this operating point 3000 is below the curve 2620, spatial scalability should be used to obtain the best quality for the CIF data. In another case, 0.1 Mbps is used for the QCIF resolution, and 0.4 Mbps is used for the CIF resolution. Since this operating point 3020 is above the curve 2620, simulcast coding should be used to achieve the best quality for the CIF data. Recall that the quality of the QCIF data is the same regardless of whether simulcast coding or scalability coding is used.

While the simulations described here used a number of encoding and decoding experiments before settling on which transmission mode to use, one may be able to determine model parameters without having to run encoding/decoding experiments for every sequence.

Determining new model parameters for each sequence may not be necessary if one already has good model parameters. This may be the case for sequences that are similar. For example, in FIG. 26, the sequences carphone 2620, news 2640, and silentvoice 2650 have a similar coding decision boundary. Using the boundary obtained with one of these sequences to assist the simulcast/scalable coding decision may still be optimal for the coding of a different sequence, as long as the data points are not close to the decision boundary. Determining new model parameters for each sequence may be desirable, especially if one wants to maximize the quality of video delivery, despite the increased computational costs.

Figure 31:
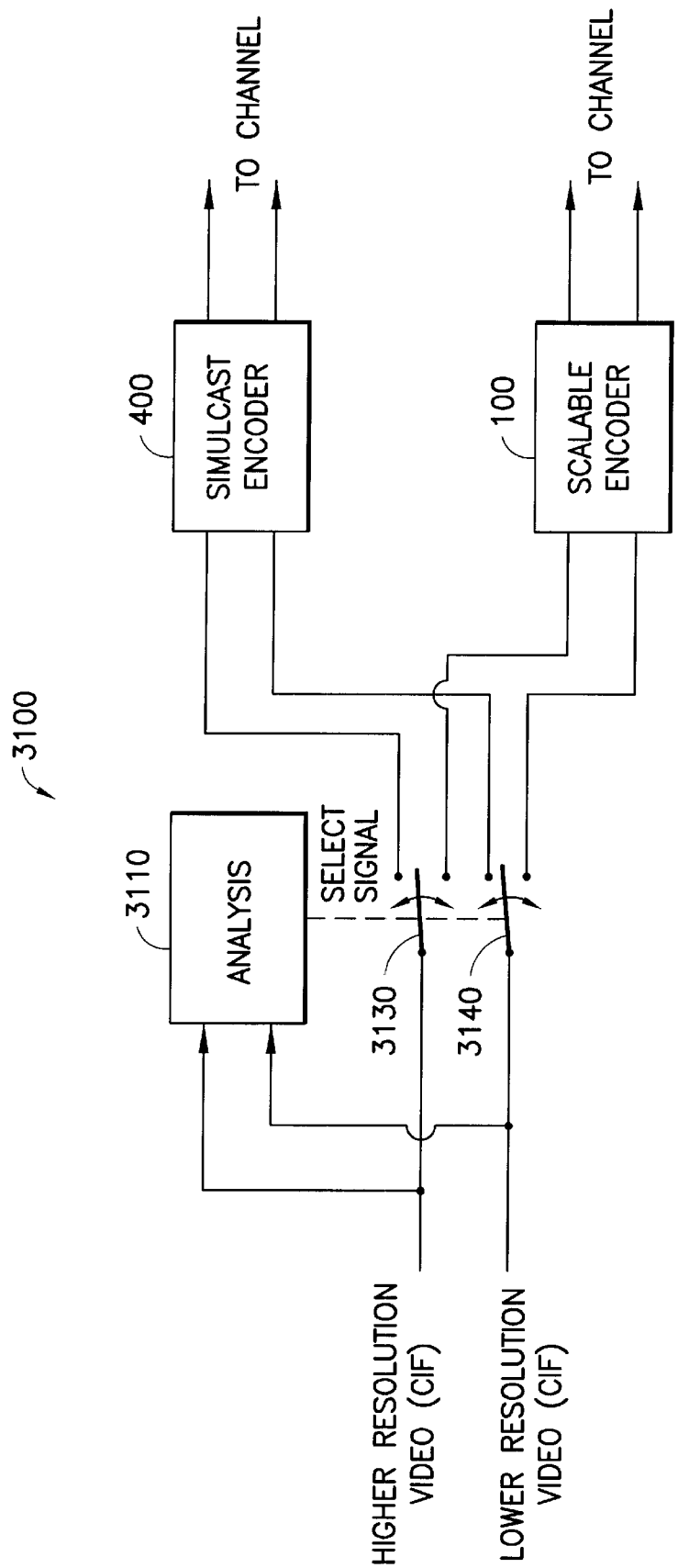
FIG. 31 illustrates an adaptive simulcast/spatial scalability encoder apparatus in accordance with the present invention.

FIG. 31 illustrates an adaptive simulcast/spatial scalability encoder apparatus in accordance with the present invention. A higher-resolution video sequence (such as CIF), and a lower-resolution video sequence (such as QCIF) are provided to an analysis function 3110, and to respective switches 3130 and 3140. The analysis function 3110 analyzes the video sequences based on the above discussion to provide a select signal to the switches 3130, 3140 to route both of the sequences to either the simulcast encoder 400 or the scalable encoder 100. See FIGS. 1 and 4, respectively.

The analysis function 3110 may include a decoder and encoder, where the PSNR of a layer is determined by comparing the output of the decoder to the input to the encoder.

Successive sequences, each having several (e.g., 150) pictures/frames, may be analyzed to adaptively route each sequence to either the simulcast encoder 400 or the scalable encoder 100. Moreover, the analysis may occur off-line, prior to when the video is transmitted to a user. In this manner, unnecessary processing delays are avoided. For example, the video data may be recovered from a memory, analyzed, then returned to the storage device. Each sequence of analyzed data may be marked to indicate whether it is to be subsequently routed to either the simulcast encoder 400 or the scalable encoder 100. This marking may be achieved any number of ways, such as providing overhead control bits with the video data.

Moreover, note that the decoders should have the capability to determine whether they are receiving a simulcast-coded or scalability-coded stream. This can be achieved according to the relevant data standard (e.g., MPEG-4). Moreover, the decoders should have scalable decoding capabilities and single layer decoding capabilities. Advantageously, the invention can be carried out without modification to such decoders.

It should now be appreciated that the present invention provides for the compression of video data for multicast environments. Spatial scalability and simulcast coding are used in the compression process. Simulations are provided to compare the performance of spatial scalability and simulcast coding of lower-resolution (e.g., QCIF) and higher-resolution (e.g., CIF) sequences. The main results and conclusions of this work are:

The use of a logarithmic model to represent single layer coding results. This model can then be used to easily compute the bit allocation that achieves equal quality in both layers of simulcast coding.

Allocating 40±4% (e.g., 36–44%) of the total bandwidth to the lower-resolution stream achieves equal quality in both streams of simulcast coding.

Allocating less than 20% of the total bandwidth to the base layer for spatial scalable coding is inefficient.

Allocating 45±5% (e.g., 40–50%) of the total bandwidth to the base layer achieves equal quality in both layers of spatial scalable coding.

Spatial scalability may be the only option at relatively low enhancement bit rates, and simulcast coding may be the only option at relatively high enhancement bit rates, but spatial scalability usually gives higher quality in the common operating region.

Decision boundaries can be generated to guide the decision between spatial scalability and simulcast coding.

Simulcast coding can outperform spatial scalability when a small proportion of bits is allocated to the base layer/lower-resolution stream. This may be due to the overhead of the scalable coding syntax and/or bad prediction from the base layer.

Although the invention has been described in connection with various preferred embodiments, it should be appreciated that various modifications and adaptations may be made thereto without departing from the scope of the invention as set forth in the claims.

What is claimed is:

1. A method for coding video data, comprising the steps of:

modeling a quality of lower resolution video data and of corresponding higher resolution video data at varying bit allocations between the lower and higher resolution video data;

determining a crossover point of the modeled qualities at which the lower and higher resolution video data have an approximately equal quality, said crossover point indicating a corresponding bit allocation between said lower and higher resolution video data; and coding the video data in accordance with the corresponding bit allocation to provide said lower and higher resolution video data at approximately equal quality levels.

2. The method of claim 1, wherein:
the video data coded in said coding step comprises a sequence of pictures.

3. The method of claim 1, wherein:
the corresponding bit allocation is an average over a sequence of pictures that comprise the lower and higher resolution video data.

4. The method of claim 1, wherein:
the video data coded in said coding step is different than the video data used in said modeling step.

5. The method of claim 1, wherein:
the video data coded in said coding step is the same as the video data used in said modeling step.

6. The method of claim 1, wherein:
the quality comprises a peak signal-to-noise ratio (PSNR).

7. The method of claim 1, wherein:
said modeling step uses a logarithmic model.

8. The method of claim 1, wherein:
the coded-video data is coded in independent simulcast streams.

9. The method of claim 1, wherein:
the coded video data is coded using spatial scalability coding in a base layer and at least one enhancement layer.

10. The method of claim 1, wherein:
the crossover point is determined in accordance with a bisection algorithm.

11. The method of claim 1, wherein:
the crossover point is extrapolated.

12. A method for coding video data, comprising the steps of:
modeling a quality of lower resolution video data, and of corresponding higher resolution video data, for varying bit allocations between the lower and higher resolution video data, by using each of: (a) simulcast coding, and (b) spatial scalability coding; and
coding the video data at a desired bit allocation for the lower and higher resolution video data using one of the simulcast coding and the spatial scalability coding according to whichever results in a larger modeled quality at the desired bit allocation.

13. The method of claim 12, wherein:
the video data comprises a sequence of pictures.

14. The method of claim 12, wherein:
the desired bit allocation is an average over a sequence of pictures that comprise the lower and higher resolution video data.

15. The method of claim 12, wherein:
the video data coded in said coding step is different than the video data used in said modeling step.

16. The method of claim 12, wherein:
the video data coded in said coding step is the same as the video data used in said modeling step.

17. The method of claim 12, wherein:
the modeled qualities comprise a peak signal-to-noise ratio (PSNR).

18. The method of claim 12, wherein:
said modeling step uses a logarithmic model.

19. A method for coding video data, comprising the steps of:
(a) determining a bit allocation decision boundary for varying bit allocations for lower resolution video data;
wherein, for the varying bit allocations for the lower resolution video data, the decision boundary designates a bit allocation for corresponding higher resolution video data;

(b) determining an operating point for the video data based on desired bit allocations for lower resolution video data thereof and corresponding higher resolution video data thereof;

(c) coding the video data using simulcast coding if the operating point indicates the desired bit allocation of the higher resolution video data of said step (b) exceeds a bit allocation designated by the decision boundary; and (d) coding the video data using spatial scalability coding if the operating point indicates the desired bit allocation of the higher resolution video data of said step (b) is less than a bit allocation designated by the decision boundary.

20. The method of claim 19, wherein:
the decision boundary corresponds to a bit allocation of approximately 20% of an available bandwidth to the lower resolution video data in said step (a) and approximately 80% of the available bandwidth to the higher resolution video data in said step (a).

21. The method of claim 19, wherein:
the video data comprises a sequence of pictures.

22. The method of claim 21, wherein:
the desired bit allocations in said step (b) are averages over the sequence of pictures.

23. The method of claim 19, wherein:
the video data coded in said coding steps is different from the video data used in said step (a).

24. The method of claim 19, wherein:
the video data coded in said coding steps is the same as the video data used in said step (a).

25. A method for coding video data comprising lower resolution data and corresponding higher resolution data, comprising the steps of:
(a) allocating a first portion of an available bandwidth to the lower resolution data, and a remainder of the available bandwidth to the higher resolution data; and
(b) coding the video data using simulcast coding if the first portion is less than approximately 20% of the available bandwidth, and using spatial scalability coding if the first portion is greater than approximately 20% of the available bandwidth.

26. A method for coding video data comprising lower resolution data and corresponding higher resolution data, comprising the step of:
allocating approximately 36–44% of an available bandwidth to the lower resolution data, and a remainder of the available bandwidth to the higher resolution data to achieve an approximately equal quality for the lower and higher resolution data when said lower and higher resolution data are simulcast coded.

27. The method of claim 26, wherein:
the quality comprises a peak signal-to-noise ratio (PSNR).

28. A method for coding video data comprising lower resolution data and corresponding higher resolution data, comprising the step of:
allocating approximately 40–50% of an available bandwidth to the lower resolution data, and a remainder of the available bandwidth to the higher resolution data to achieve an approximately equal quality for the lower and higher resolution data when said lower and higher resolution data are spatial scalability coded.

29. The method of claim 28, wherein:
the quality comprises a peak signal-to-noise ratio (PSNR).

30. A method for communicating video data comprising lower resolution data and corresponding higher resolution data to at least a first user via a network that adaptively uses spatial scalability coding and simulcast coding, comprising the step of:

configuring a switching device in the network to selectively forward at least one of the lower and higher resolution data to the first user according to which of the spatial scalability coding and the simulcast coding is being used, and according to a data service capacity of the first user.

31. The method of claim 30, wherein:

when the simulcast coding is used, the switching device is configured to: (a) forward the higher resolution data to the first user if a data rate of the higher resolution data is within the data service capacity, and (b) to forward the lower resolution data to the first user if the data rate of the higher resolution data is not within the data service capacity, but a data rate of the lower resolution data is within the data service capacity.

32. The method of claim 30, wherein:

when spatial scalability coding is used, the switching device is configured to: (a) forward both the higher and lower resolution data to the first user if a combined data rate thereof is within the data service capacity, and (b) to forward the lower resolution data to the first user if the combined data rate is not within the data service capacity, but a data rate of the lower resolution data is within the data service capacity.

33. The method of claim 30, wherein:

the switching device comprises a router.

34. An apparatus for coding video data, comprising:

means for modeling a quality of lower resolution video data and of corresponding higher resolution video data at varying bit allocations between the lower and higher resolution video data;

means for determining a crossover point of the modeled qualities at which the lower and higher resolution video data have an approximately equal quality, said crossover point indicating a corresponding bit allocation between said lower and higher resolution video data; and means for coding the video data in accordance with the corresponding bit allocation to provide said lower and higher resolution video data at approximately equal quality levels.

35. An apparatus for coding video data, comprising:

means for modeling a quality of lower resolution video data, and of corresponding higher resolution video data, for varying bit allocations between the lower and higher resolution video data, by using each of: (a) simulcast coding, and (b) spatial scalability coding; and means for coding the video data at a desired bit allocation for the lower and higher resolution video data using one of the simulcast coding and the spatial scalability coding according to whichever results in a larger modeled quality at the desired bit allocation.

36. An apparatus for coding video data, comprising:

(a) means for determining a bit allocation decision boundary for varying bit allocations for lower resolution video data;

wherein, for the varying bit allocations for the lower resolution video data, the decision boundary designates a bit allocation for corresponding higher resolution video data;

(b) means for determining an operating point for the video data based on desired bit allocations for lower resolution video data thereof and corresponding higher resolution video data thereof;

(c) means for coding the video data using simulcast coding if the operating point indicates the desired bit allocation of the higher resolution video data of said means (b) exceeds a bit allocation designated by the decision boundary; and (d) means coding the video data using spatial scalability coding if the operating point indicates the desired bit allocation of the higher resolution video data of said means (b) is less than a bit allocation designated by the decision boundary.

37. An apparatus for coding video data comprising lower resolution data and corresponding higher resolution data, comprising:

(a) means for allocating a first portion of an available bandwidth to the lower resolution data, and a remainder of the available bandwidth to the higher resolution data; and (b) means for coding the video data using simulcast coding if the first portion is less than approximately 20% of the available bandwidth, and using spatial scalability coding if the first portion is greater than approximately 20% of the available bandwidth.

38. An apparatus for coding video data comprising lower resolution data and corresponding higher resolution data, comprising:

means for allocating approximately 36–44% of an available bandwidth to the lower resolution data, and a remainder of the available bandwidth to the higher resolution data to achieve an approximately equal quality for the lower and higher resolution data when said lower and higher resolution data are simulcast coded.

39. An apparatus for coding video data comprising lower resolution data and corresponding higher resolution data, comprising:

means for allocating approximately 40–50% of an available bandwidth to the lower resolution data, and a remainder of the available bandwidth to the higher resolution data to achieve an approximately equal quality for the lower and higher resolution data when said lower and higher resolution data are spatial scalability coded.

40. An apparatus for communicating video data comprising lower resolution data and corresponding higher resolution data to at least a first user via a network that adaptively uses spatial scalability coding and simulcast coding, comprising:

means for configuring a switching device in the network to selectively forward at least one of the lower and higher resolution data to the first user according to which of the spatial scalability coding and the simulcast coding is being used, and according to a data service capacity of the first user.

* * * * *